(12) United States Patent
Popovic et al.

(10) Patent No.: US 12,069,365 B2
(45) Date of Patent: Aug. 20, 2024

(54) METHODS AND APPARATUS TO SYNCHRONIZE MULTIPLE DEVICES

(71) Applicant: Intel Corporation, Santa Clara, CA (US)

(72) Inventors: Vladan Popovic, Santa Clara, CA (US); Michael Mefenza Nentedem, Santa Clara, CA (US); Binoy Marvar, San Jose, CA (US); Saurin Shah, Portland, OR (US); Steven Van Gent, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 17/711,941

(22) Filed: Apr. 1, 2022

(65) Prior Publication Data
US 2022/0294975 A1    Sep. 15, 2022

(51) Int. Cl.
*H04N 23/661* (2023.01)
*H04N 21/218* (2011.01)

(52) U.S. Cl.
CPC ..... *H04N 23/661* (2023.01); *H04N 21/21805* (2013.01)

(58) Field of Classification Search
CPC ........... H04N 23/661; H04N 21/21805; H04N 21/4305; H04N 23/60; H04N 23/90
See application file for complete search history.

(56) References Cited

U.S. PATENT DOCUMENTS

| | | | |
|---|---|---|---|
| 7,333,725 B1 * | 2/2008 | Frazier | H04N 23/66 348/207.99 |
| 9,639,935 B1 * | 5/2017 | Douady-Pleven | H04N 13/271 |
| 2019/0149702 A1 * | 5/2019 | Satoh | H04N 23/60 348/521 |

* cited by examiner

*Primary Examiner* — Christopher K Peterson
(74) *Attorney, Agent, or Firm* — Hanley, Flight & Zimmerman, LLC

(57) ABSTRACT

Methods, apparatus, systems, and articles of manufacture are disclosed that synchronize multiple devices. An example apparatus includes memory, instructions, and processor circuitry to execute the instructions to at least obtain first images using a first trigger frequency and second images using a second trigger frequency, the second trigger frequency different from the first trigger frequency, identify a first number of time units between a first time corresponding to a first one of the first images and a second time corresponding to a first one of the second images, the first number of time units defining a first time window, and in response to the first time window exceeding a threshold, adjust the second trigger frequency based on the number of time units such that a subsequent time window satisfies the threshold.

25 Claims, 18 Drawing Sheets

METHODS AND APPARATUS TO SYNCHRONIZE MULTIPLE DEVICES

FIELD OF THE DISCLOSURE

This disclosure relates to computing devices and, more particularly, to methods and apparatus to synchronize multiple devices.

BACKGROUND

Multi-sensor systems are used in many environments today. For example, live streamers often utilize multiple cameras and/or multiple microphones. The live streamer can switch between certain ones of the cameras and/or microphones during the streaming session to broadcast to their audience. Multi-camera and/or multi-microphone systems are also used in other scenarios such as videoconferencing, sports game broadcasting, etc.

Figure 1:
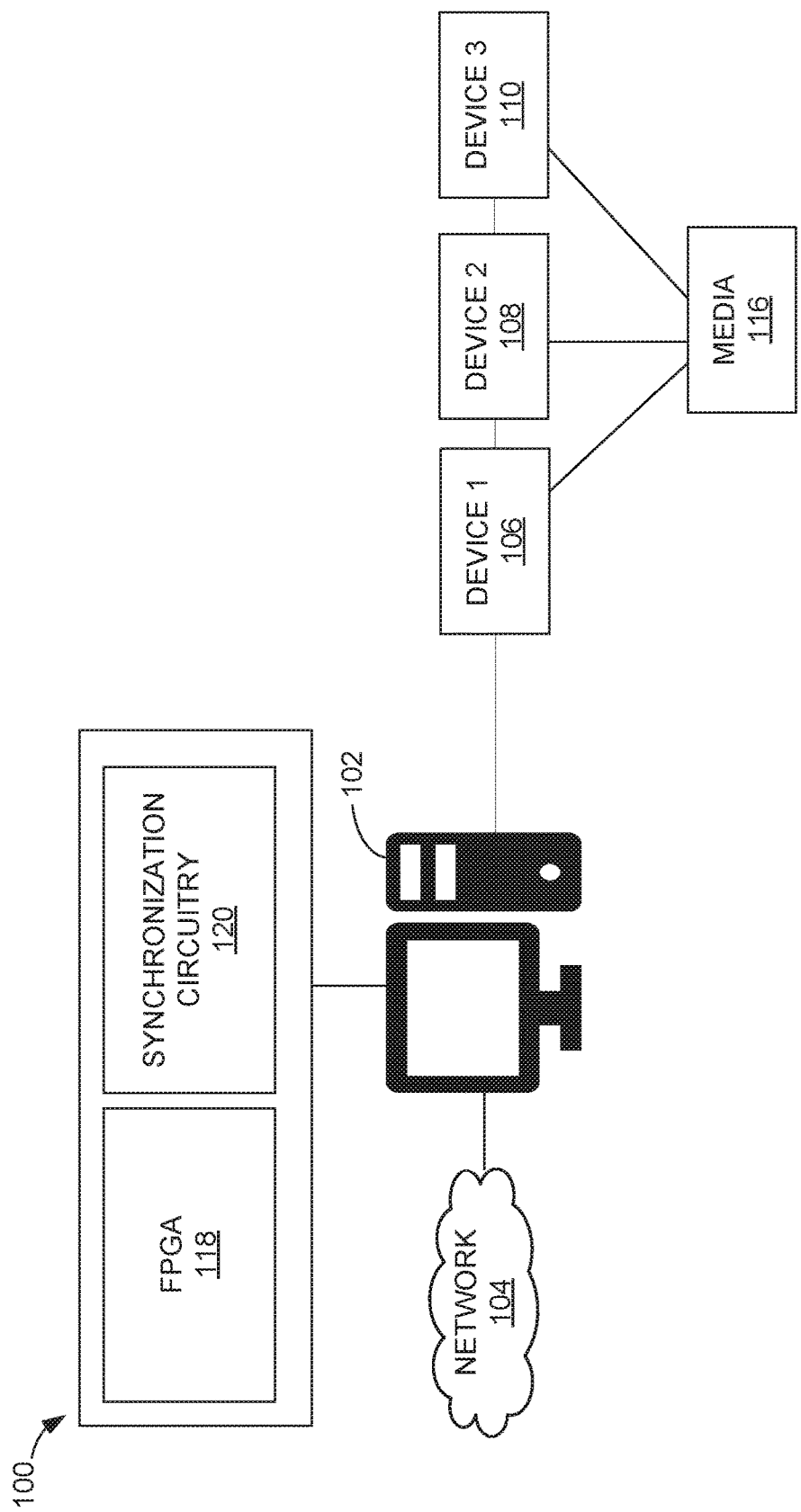
FIG. 1 illustrates an example multi-device system constructed in accordance with the teachings of this disclosure.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Multi-sensor systems are used in many environments today. For example, multi-camera arrays are common in many mobile devices (e.g., Apple iPhone, Samsung, Huawei, LG, HTC, etc.), commercial telepresence systems (e.g., Cisco TelePresence, Polycom RealPresence, Zoom rooms, etc.), filmmaking, and video production (e.g., Lytro Immerge, RED camera, etc.). Additionally, many live streamers on Twitch®, YouTube® Live, Facebook® Live, Instagram® Live, etc., use multiple cameras during a live streaming session. The cameras can be positioned or oriented to record the user or other objects and/or an event in the environment from different angles. During the live streaming session, the user may switch between different cameras to broadcast to their audience, which creates an engaging and entertaining production. Similarly, live streamers often utilize multiple microphones, and the user may switch between different ones of the microphones during the live streaming session.

Multi-camera and multi-microphone systems are also used for video-conferencing, sports game broadcasting, and many other applications to create an immersive visual experience in content creation. Circular camera arrays (e.g., 360-degree arrays) have also been developed in recent years, such as Facebook Surround 360, Google Jump, Google Lightfield VR, GoPro Omni, Jaunt XR, Intel True VR, etc. These systems were mostly targeted at research or professional content creation communities. Additionally, multi-camera systems can be implemented in applications for stereo vision, depth perception, multiple region of interest (ROI) capture, and variable viewpoint video and light field capture.

These multi-device (e.g., multi-camera) systems require time synchronization between devices. This synchronization can typically be accomplished via software register interface or external on-board trigger signals generated by a microcontroller. However, these approaches neither accurately synchronize a timer within the device (e.g., the software approach) nor synchronize timers across multiple devices (e.g., the external on-board trigger approach). Furthermore, increasing the number of devices (e.g., microphones, cameras, etc.) in a multi-device system creates bandwidth issues in the processing unit (e.g., an embedded system and/or a PC workstation). Thus, the number of devices involved in a multi-device system is limited.

Prior techniques to attempt to synchronize timers of a multi-device system, such as GoPro Omni, Google Jump, and Google Lightfield VR, do not have any streaming capabilities and rely solely on secure digital (SD) card storage. For example, Facebook Surround 360 uses universal serial bus (USB) based cameras and require a computer with multiple dependent USB3 ports or a unique aggregation computer. Additional techniques, such as Intel True VR, used Ethernet-based cameras and copper-to-fiber conversion to transmit data to a remote server rack. However, such prior approaches do not provide a scalable solution and/or a straightforward device for personal computer (PC) interaction. Further, prior approaches are limited to low resolution images and video, lack synchronization between devices, require complex networking infrastructure, lack real-time camera control, are physically cumbersome, are difficult to operate and/or are unable to stream live data to users.

Another prior technique for syncing multi-device systems include external trigger pulses from a microcontroller, FPGA, or other programmable signal generator. However, this method cannot sync multiple devices that each have respective controllers. Additionally, such systems require extra external cables between devices to propagate pulses.

Examples disclosed herein provide a multi-device system with trigger synchronization, data aggregation, image processing at the edge, and real-time, high bandwidth data transfer to users. Examples disclosed herein provide high resolution streaming. Examples disclosed herein combine hardware triggering and global timestamping to achieve micro-second precision and consistency in a multi-device system (e.g., daisy chained devices). Examples disclosed herein enable synchronization of a multi-device system with efficient use of external cables. Examples disclosed herein provide a scalable multi-device system for use with multiple different types of devices (e.g., cameras, microphones, speakers, etc.). Examples disclosed herein include a high speed Peripheral Component Interconnect Express (PCIe) interface. Examples disclosed herein can be used to develop immersive visual experience (IVE) algorithms for video streaming, instructional video recording, online influencing live streaming, and/or immersive teleconferencing.

Examples disclosed herein include processor circuitry to execute the instructions to at least obtain first images using a first trigger frequency and second images using a second trigger frequency, the second trigger frequency different from the first trigger frequency, identify a first number of time units between a first time corresponding to a first one of the first images and a second time corresponding to a first one of the second images, the first number of time units defining a first time window, and in response to the first time window exceeding a threshold, adjust the second trigger frequency based on the number of time units such that a subsequent time window satisfies the threshold.

FIG. 1 illustrates an example multi-device system 100 in which examples disclosed herein can be implemented. The multi-device system 100 includes example electronic device 102, an example network 104, example devices 106, 108, 110, and example media 116. The example electronic device 102 includes and example FPGA 118 and example synchronization circuitry 120.

In this example, the electronic device 102 is implemented as a desktop computer. However, in other examples, the electronic device 102 can be implemented by any other type of electronic device, such as a smartphone, a tablet, a laptop computer, a game console, etc.

In the illustrated example, the example multi-device system 100 includes three devices 106, 108, 110 capturing (e.g., recording, viewing, etc.) the media 116. In some examples, the three devices 106, 108, 110 can be cameras recording an event (e.g., capturing images, capturing video, etc.) in the media 116. However, the devices 106, 108, 110 can be microphones recording audio in the media 116. The devices 106, 108, 110 can be positioned at different angles to record the media 116 and/or the surrounding environment (e.g., the room the media is positioned in). Each of the devices 106, 108, 110 generates a respective video (e.g., image, audio clip, etc.) and transmits the data to the device 102. The devices 106, 108, 110 can be physically connected (e.g., via one or more wires or cables, via a daisy chain arrangement, etc.). In some examples, the devices 106, 108, 110 are discrete devices that are separate from the electronic device 102. While in this example, the multi-device system 100 includes three devices 106, 108, 110, in other examples, the multi-device system 100 can include any number of devices and/or any combination of devices.

In FIG. 1, the multi-device system 100 includes the example FPGA 118 and the example synchronization circuitry 120. In this example, the synchronization circuitry 120 (e.g., Thunderbolt controller) is implemented on the electronic device 102. For example, the synchronization circuitry 120 may be an application or software executed by the FPGA 118 associated with the device 102. The example FPGA 118 serves as the main data aggregation and processing unit in the multi-device system 100. The example devices 106, 108, 110 transmit data relating to the media 116 to the FPGA 118. In some examples, the synchronization circuitry 120 is embedded in the instructions of the FPGA 118. The example synchronization circuitry 120 processes the data (e.g., video, images, audio, etc.) generated by the devices 106, 108, 110. Additionally or alternatively, the example synchronization circuitry 120 can synchronize (e.g., sync) sensors associated with the device 106, 108, 110. For example, the synchronization circuitry 120 can synchronize camera triggers (e.g., pulses) in each of the devices 106, 108, 110. An example implementation of the synchronization circuitry is described below in FIG. 2.

Figure 2:
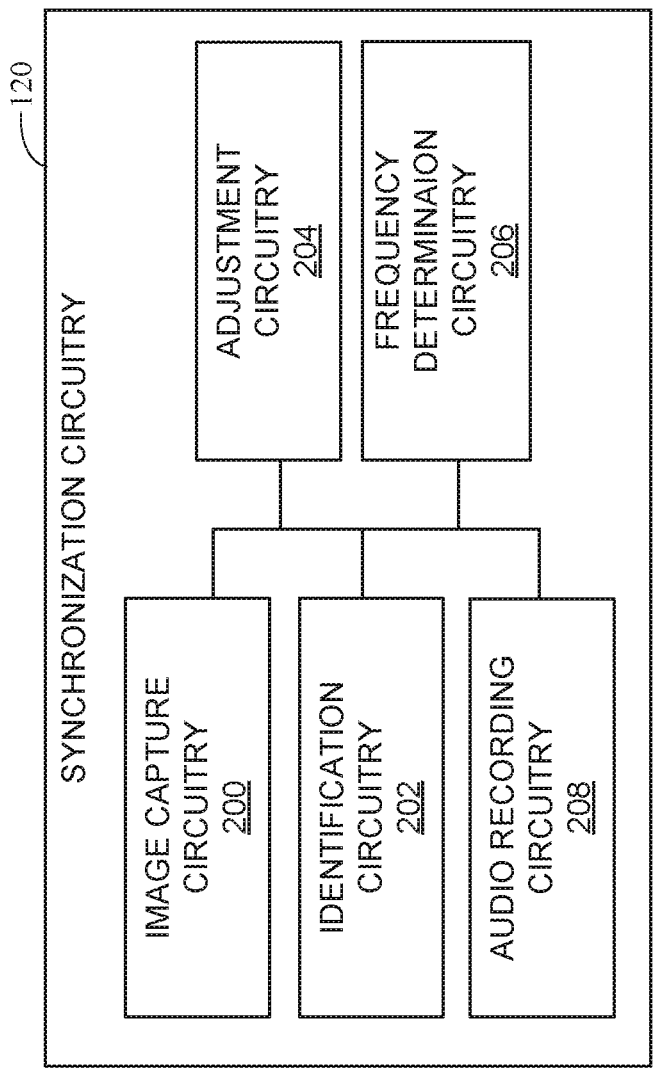
FIG. 2 is a block diagram of example synchronization circuitry included in the example multi-device system of FIG. 1.

FIG. 2 is a block diagram of the example synchronization circuitry 120 to synchronize multiple devices. The synchronization circuitry 120 of FIGS. 1 and 2 may be instantiated (e.g., creating an instance of, bring into being for any length of time, materialize, implement, etc.) by processor circuitry such as a central processing unit executing instructions. Additionally or alternatively, the synchronization circuitry 120 of FIGS. 1 and 2 may be instantiated (e.g., creating an instance of, bring into being for any length of time, materialize, implement, etc.) by an ASIC or an FPGA (e.g., the FPGA 118) structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

The example synchronization circuitry 120 of the example of FIGS. 1 and 2 includes example image capture circuitry 200, example identification circuitry 202, example adjuster circuitry 204, example frequency determination circuitry 206, and example audio recording circuitry 208.

The example image capture circuitry 200 captures (e.g., obtains) images of the media 116 using a first device (e.g., the device 106) and images of the media 116 using a second device (e.g., the device 108). In some examples, the devices 106, 108, 110 are positioned at different angles with respect to the media 116 such that the image capture circuitry 200 captures first images with the device 106 and second images with the device 108, the first images different from the second images. Additionally or alternatively, the devices 106, 108, 110 (e.g., cameras) each have respective trigger frequencies for capturing images such that the image capture circuitry 200 captures the first and second images of the media 116 at different times. In some examples, the device 106 has a first trigger frequency and the device 108 has a second trigger frequency, the second trigger frequency different from the first trigger frequency.

In some examples, the example synchronization circuitry 120 includes means for obtaining images. For example, the means for obtaining may be implemented by image capture circuitry 200. In some examples, the image capture circuitry 200 be instantiated by processor circuitry such as the example processor circuitry 1712 of FIG. 17. For instance, the image capture circuitry 200 may be instantiated by the example general purpose processor circuitry 1800 of FIG. 18 executing machine executable instructions such as that implemented by at least blocks 1502, 1504, 1602 of FIG. 15. In some examples, the image capture circuitry 200 may be instantiated by hardware logic circuitry, which may be implemented by an ASIC or the FPGA circuitry 1900 of FIG. 19 structured to perform operations corresponding to the machine readable instructions. Additionally or alternatively, the image capture circuitry 200 may be instantiated by any other combination of hardware, software, and/or firmware. For example, the image capture circuitry 200 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example identification circuitry 202 identifies a number of time units between images corresponding to the first device 106 and images corresponding to the second device 108. In some examples, the different trigger frequencies associated with the devices 106, 108 capture images at different times (e.g., frequencies, instances, etc.). The example identification circuitry 202 can identify time windows between ones of the first images from the device 106 and ones of the second images from the device 108. For example, a first image captured by the device 106 corresponds to a first time (e.g., time T) and a first image captured by the device 108 corresponds to a second time (e.g., time T+$\Delta$T). Accordingly, the example identification circuitry 202 can identify a time window (e.g., a first time window, $T_w$, a number of time units, seconds, etc.) between the first time (T) and the second time (T+$\Delta$T). In some examples, the example identification circuitry 202 can identify multiple time windows between different kinds of the devices 106, 108, 110. For example, the identification circuitry 202 can identify a first time window (e.g., a first number of time units) between images captured by the cameras 106, 108 and a second time window (e.g., a second number of time units) between audio captured by the microphone 110 and images captured by the camera 108 and/or the camera 106.

In some examples, the example synchronization circuitry 120 includes means for identifying time (e.g., time units, time window, etc.). For example, the means for identifying may be implemented by identification circuitry 202. In some examples, the identification circuitry 202 be instantiated by processor circuitry such as the example processor circuitry 1712 of FIG. 17. For instance, the identification circuitry 202 may be instantiated by the example general purpose processor circuitry 1800 of FIG. 18 executing machine executable instructions such as that implemented by at least blocks 1506, 1508, 1510, 1512 of FIG. 15 and blocks 1606, 1608, 1610, 1612 of FIG. 16. In some examples, the identification circuitry 202 may be instantiated by hardware logic circuitry, which may be implemented by an ASIC or the FPGA circuitry 1900 of FIG. 19 structured to perform operations corresponding to the machine readable instructions. Additionally or alternatively, the identification circuitry 202 may be instantiated by any other combination of hardware, software, and/or firmware. For example, the identification circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example adjustment circuitry 204 adjusts the trigger frequency of any of the devices 106, 108, 110. In some examples, the adjustment circuitry 204 adjusts (e.g., changes, increases, decreases, etc.) the trigger frequency of the device 108 based on the number of time units (e.g., the first time window, $T_w$, etc.) such that a subsequent time window satisfies a threshold (e.g., 16 nanoseconds (ns)). In some examples, the adjustment circuitry 204 adjusts the trigger frequency across different types of devices 106, 108, 110. For example, the adjustment circuitry 204 can adjust the trigger frequency of the microphone 110 based on the trigger frequency of the camera 106.

In some examples, the example synchronization circuitry 120 includes means for adjusting trigger frequencies. For example, the means for adjusting may be implemented by the adjustment circuitry 204. In some examples, the adjustment circuitry 204 be instantiated by processor circuitry such as the example processor circuitry 1612 of FIG. 16. For instance, the adjustment circuitry 204 may be instantiated by the example general purpose processor circuitry 1800 of FIG. 18 executing machine executable instructions such as that implemented by at least blocks 1514 of FIG. 15 and block 1612 of FIG. 16. In some examples, the adjustment circuitry 204 may be instantiated by hardware logic circuitry, which may be implemented by an ASIC or the FPGA circuitry 1900 of FIG. 19 structured to perform operations corresponding to the machine readable instructions. Additionally or alternatively, the adjustment circuitry 204 may be instantiated by any other combination of hardware, software, and/or firmware. For example, the adjustment circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example frequency determination circuitry 206 determines trigger frequencies based on oscillators (e.g., crystal oscillators, on-board oscillators, ticks from an oscillator, etc.) associated with each of the devices 106, 108, 110. For example, the frequency determination circuitry 206 determines a first trigger frequency based on an oscillator of the device 106. However, the example frequency determination circuitry 206 can also determine a second trigger frequency based on an oscillator of the device 108. Additionally or alternatively, the example frequency determination circuitry 206 determines a synchronized frameset based on the adjusted trigger frequencies. For example, when the trigger frequencies for the devices 106, 108, 110 are adjusted based on the respective time windows (e.g., the first time window, the second time window, $T_w$, etc.), the example frequency determination circuitry 206 determines a synchronized frameset to compile (e.g., list, aggregate, etc.) the media 116 at the adjusted trigger frequency. As such, the frequency determination circuitry 206 can determine a synchronized frameset (e.g., data file) including the first images from the device 106, the second images from the device 108, and the audio from the device 110.

In some examples, the example synchronization circuitry 120 includes means for determining. For example, the means for determining may be implemented by frequency determination circuitry 206. In some examples, the frequency determination circuitry 206 be instantiated by processor circuitry such as the example processor circuitry 1712 of FIG. 17. For instance, the frequency determination circuitry 206 may be instantiated by the example general purpose processor circuitry 1800 of FIG. 5 executing machine executable instructions such as that implemented by at least blocks 1518 of FIG. 15 and 1618 of FIG. 16. In some examples, the frequency determination circuitry 206 may be instantiated by hardware logic circuitry, which may be implemented by an ASIC or the FPGA circuitry 1900 of FIG. 19 structured to perform operations corresponding to the machine readable instructions. Additionally or alternatively, the frequency determination circuitry 206 may be instantiated by any other combination of hardware, software, and/or firmware. For example, the frequency determination circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example audio recording circuitry 208 records audio of the media 116. In some examples, the audio recording circuitry 208 may be embedded in any of the devices 106, 108, 110. However, the example audio recording circuitry 208 can be instantiated as any of the devices 106, 108, 110. Additionally or alternatively, the example audio recording circuitry 208 can be embedded in the example electronic device 102. The example audio recording circuitry 208 can include a trigger frequency. In some examples, the trigger frequency associated with the example audio recording circuitry 208 is different from the example trigger frequencies associated with each of the devices 106, 108, 110. In some examples, the audio recording circuitry 208 is a microphone.

In some examples, the example synchronization circuitry 120 includes means for obtaining audio. For example, the means for obtaining audio may be implemented by audio recording circuitry 208. In some examples, the audio recording circuitry 208 be instantiated by processor circuitry such as the example processor circuitry 1712 of FIG. 17. For instance, the audio recording circuitry 208 may be instantiated by the example general purpose processor circuitry 1800 of FIG. 18 executing machine executable instructions such as that implemented by at least block 1604 of FIG. 6 In some examples, the audio recording circuitry 208 may be instantiated by hardware logic circuitry, which may be implemented by an ASIC or the FPGA circuitry 1900 of FIG. 19 structured to perform operations corresponding to the machine readable instructions. Additionally or alternatively, the audio recording circuitry 208 may be instantiated by any other combination of hardware, software, and/or firmware. For example, the audio recording circuitry 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 3:
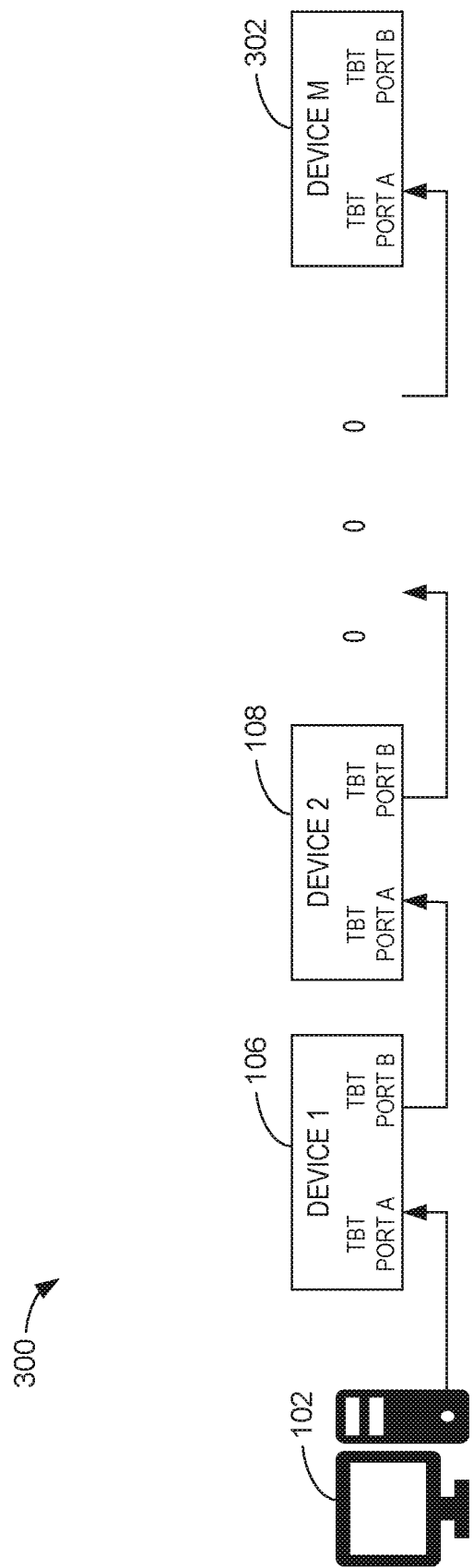
FIG. 3 illustrates an example device configuration of the example multi-device system of FIG. 1.

FIG. 3 is an example device configuration 300 of the example multi-device system of FIG. 1. The example configuration 300 includes the electronic device 102, the device 106, the device 108, and a device M 302. In the example configuration 300, the device M 302 represents any number M of devices that can be included in the configuration 300. For example, the configuration 300 can include three devices such as the devices 106, 108, 110. However, the configuration 300 can include any number of devices and/or any combination of kinds of devices (e.g., cameras, microphones, Bluetooth transceivers, Wi-Fi transceivers, inertial sensors, etc.).

In some examples, each of the devices 106, 108, 110, 302 can include multiple devices (e.g., sub-devices). For example, the device 106 can include any number of cameras, any number of microphones, any number of inertial sensors, etc. In the example of FIG. 3, the devices 106, 108, 302 are arranged in a daisy chain configuration. As such, the devices 106, 108, 302 connect via cables in sequence. For example, the device 106 is connected to the electronic device 102 via port A. Accordingly, port B on device 106 connects to port A on device 108, port B on device 108 connects to port A on a subsequent device, port B on a subsequent device connects to port A on the device M 302.

Figure 4:
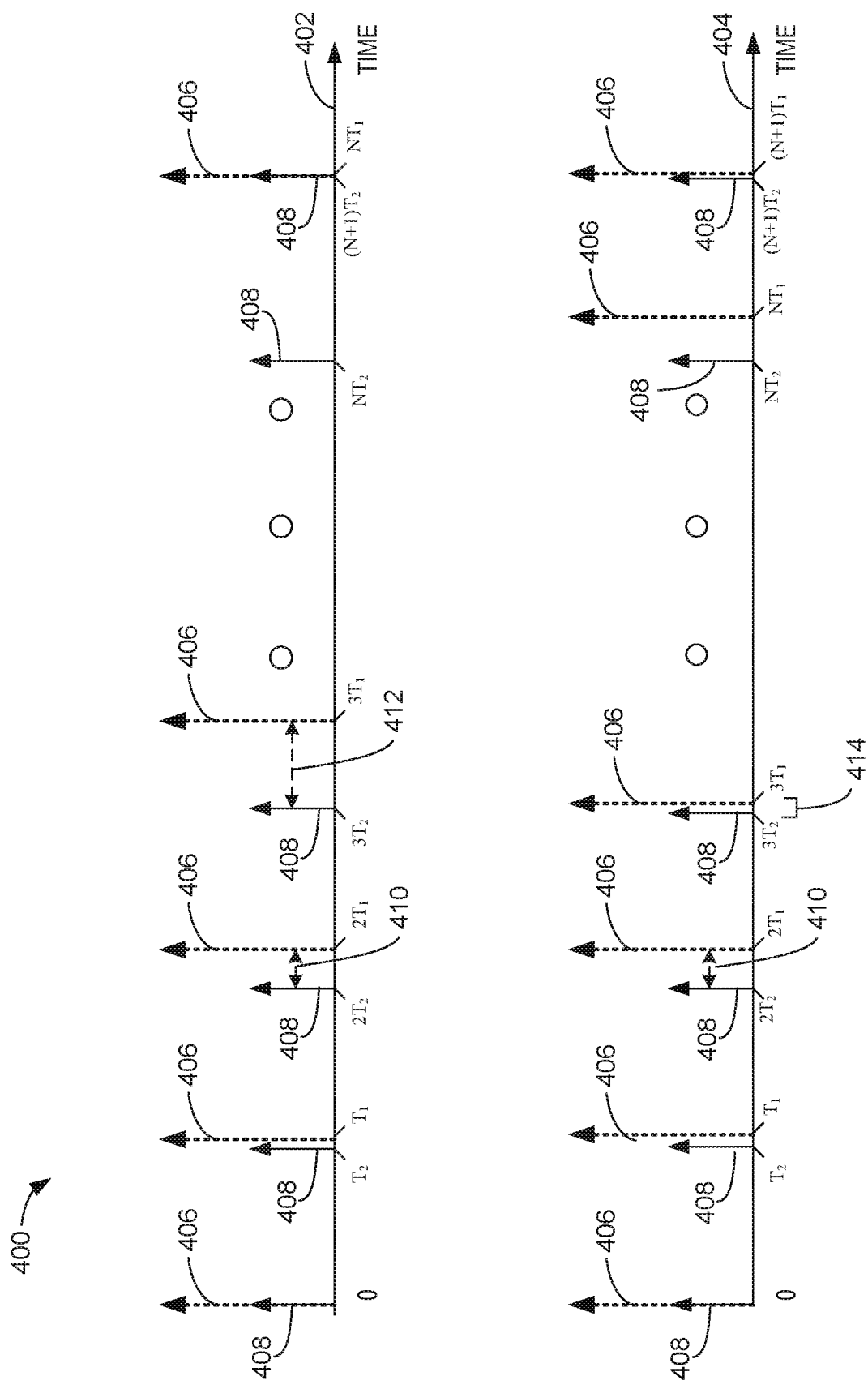
FIG. 4 illustrates an example timing sequence that can be implemented by the example synchronization circuitry of FIG. 2.

FIG. 4 is an example timing sequence 400 that can be implemented by the example synchronization circuitry of FIG. 2. The example timing sequence 400 includes example timeline 402, example timeline 404, example trigger frequency 406, example trigger frequency 408, example time window 410, example time window 412, and example time window 414.

In FIG. 4, the example trigger frequency 406 represents the trigger frequency for the device 106 of the multi-device system 100 and the example trigger frequency 408 represents the trigger frequency for the device 108. However, the example trigger frequencies 406, 408 can represent the trigger frequencies of any two of the devices 106, 108, 302. For the example of FIG. 4, the devices 106, 108 are exemplified as cameras 106, 108. The example timeline 402 demonstrates the system 100 without the synchronization circuitry 120. The example timeline 404 demonstrates the system 100 utilizing the synchronization circuitry.

In the example timeline 402, the camera 106 captures images according to the trigger frequency 406. The trigger frequency 406 can be $T_1$ (e.g., 30 microseconds (μs)) such that at every interval of the trigger frequency 406 ($T_1$) the camera 106 captures an image. For example, at time 0 on the timeline 402, the camera 106 captures a first image. At time $T_1$, the camera 106 captures a second image. At time $2T_1$, the camera 106 captures a third image. At time $3T_1$, the camera 106 captures a fourth image. At time $NT_1$, the camera 106 captures an nth image.

Similarly, in the example timeline 402, the camera 108 captures images according to the trigger frequency 408. The trigger frequency 408 can be $T_2$ (e.g., 25 μs) such that at every interval of the trigger frequency 408 ($T_2$) the camera 108 captures an image. For example, at time 0 on the timeline 402, the camera 108 captures a first image. At time $T_2$, the camera 108 captures a second image. At time $2T_2$, the camera 108 captures a third image. At time $3T_2$, the camera 108 captures a fourth image. At time $NT_2$, the camera 108 captures an nth image. At time $(N+1)T_2$, the camera 108 captures the (Nth+1) image. In some examples, the variation between the trigger frequencies 406, 408 (e.g., $T_1$ and $T_2$) can be due to different trigger settings in the cameras 106, 108. However, the variation between the trigger frequencies 406, 408 (e.g., $T_1$ and $T_2$) can be due to tolerance of the oscillator parts associated with the cameras 106, 108. Thus, even though the cameras 106, 108 can be programmed to capture images at the same time, the respective oscillators can cause a delay (e.g., drift time, lag time, etc.) in one of the cameras to cause the offset trigger frequencies.

In the example timeline 402, the trigger frequencies 406, 408 are aligned (e.g., balanced, equal, etc.) at time 0. However, at time $T_1$, the frequencies 406, 408 offset from each other. Subsequently, at time $2T_1$, the time difference between the frequencies 406, 408 define a first time window 410. In some examples, the first time window 410 can be 10 μs. For example, the camera 106 captures the third image at a time (x) and, due to the offset in the frequencies 406, 408, the camera 108 captures the third image at time (x+10 μs). At time $3T_1$, the time difference between the frequencies 406, 407 define a second time window 412. In some examples, the second time window can be 20 μs. For example, the camera captures the fourth image at a time (y) and the camera 108 captures the fourth image at a time (y+20 μs). In some examples, the system 100 can define a threshold for the maximum amount of time for time windows. In some examples, the threshold for the time windows can be 16 μs. Thus, in the example timeline 402, the second time window 412 exceeds the threshold. Additionally or alternatively, the fourth image captured with the camera 106 does not represent (e.g., mirror, equal, etc.) the fourth image captured with the camera 108 (e.g., the media 116 could have changed during the delay). Thus, the cameras 106, 108 are not synced.

In the timeline 402, subsequent time windows between the frequencies 406, 408 increase in length as the time increases. At time $NT_1$, the trigger frequencies 406, 408 are offset by at least one image. For example, at time $NT_1$, the camera 106 captures the Nth image and the camera 108 captures the (Nth+1) image. Additionally or alternatively, the Nth image captured with the camera 106 does represent (e.g., mirror, equal, etc.) the (Nth+1) image captured with the camera 108 and, thus, the cameras 106, 108 are not synced.

The example timeline 404 is similar to the example timeline 402, but, instead, represents the system 100 utilizing (e.g., employing, executing the instructions for, etc.) the synchronization circuitry 120. In the timeline 404, the example identification circuitry 202 identifies the first time window 410. In the example timeline 404, the example adjustment circuitry 204 increases the trigger frequency 408 such that a time window between the subsequent trigger frequencies 406, 408 satisfies the threshold. For example, the first time window 410 can be 10 μs. The example identification circuitry 202 identifies the 10 μs time window 410. Accordingly, the example adjustment circuitry 204 increases the trigger frequency 408 by 10 μs such that, at subsequent time $3T_1$, the time window 414 satisfies the threshold (e.g., less than 16 μs). Thus, at time $NT_1$, the trigger frequencies 406, 408 are synced. For example, at time $NT_1$, the camera 106 captures an Nth image and the camera 108 captures an Nth image. At time $(N+1)T_1$, the camera 106 captures an (Nth+1) image and the camera 108 captures an (Nth+1) image. Thus, the cameras 106, 108 and the trigger frequencies 406, 408 are synced due the synchronization circuitry 120.

Figure 5:
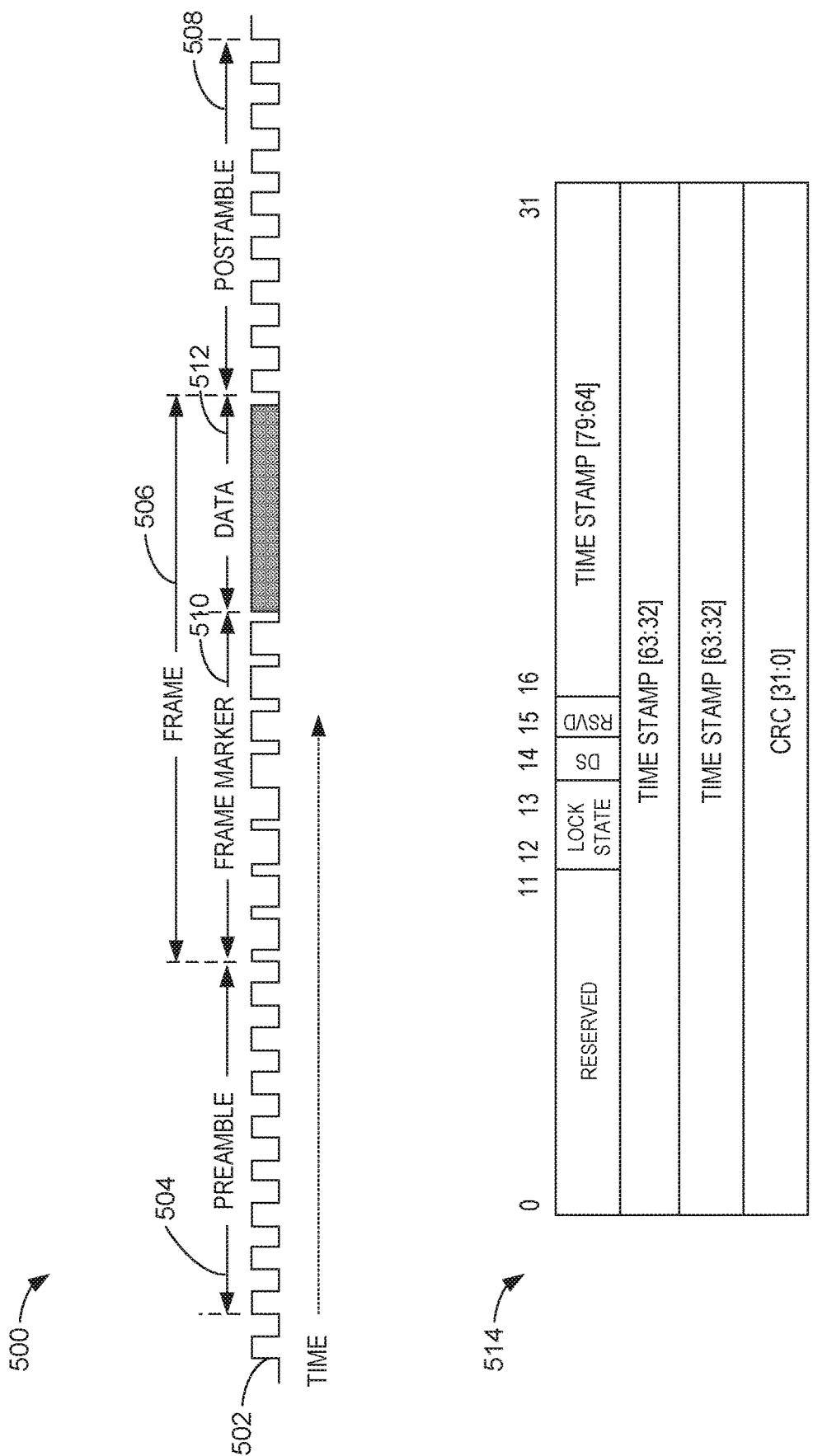
FIG. 5 illustrates another example timing sequence that can be implemented by the example synchronization circuitry of FIG. 2.

FIG. 5 is an example signal 500 captured by any of the devices 106, 108, 110, 302 in the multi-device system 100. The example signal 500 includes a timeline 502, a preamble 504, a frame 506, a postamble 508, and a time record 514. The example frame 506 includes a frame marker 510 and data 512. In some examples, the identification circuitry 202 can utilize the example signal 500 to distinguish times associated with the frame 506 and, in particular, the data 512 (e.g., the image, the audio, the video, etc.). In the example time record 514, the frame 506 can have a timestamp of 63:32 in the timeline 502 and the data 512 can have a timestamp of 79:64. In some examples, the frame 506 can be coded to include the timestamp 63:32 in the timeline 502 and the data 512 can be coded to include the timestamp 79:64.

Figure 6:
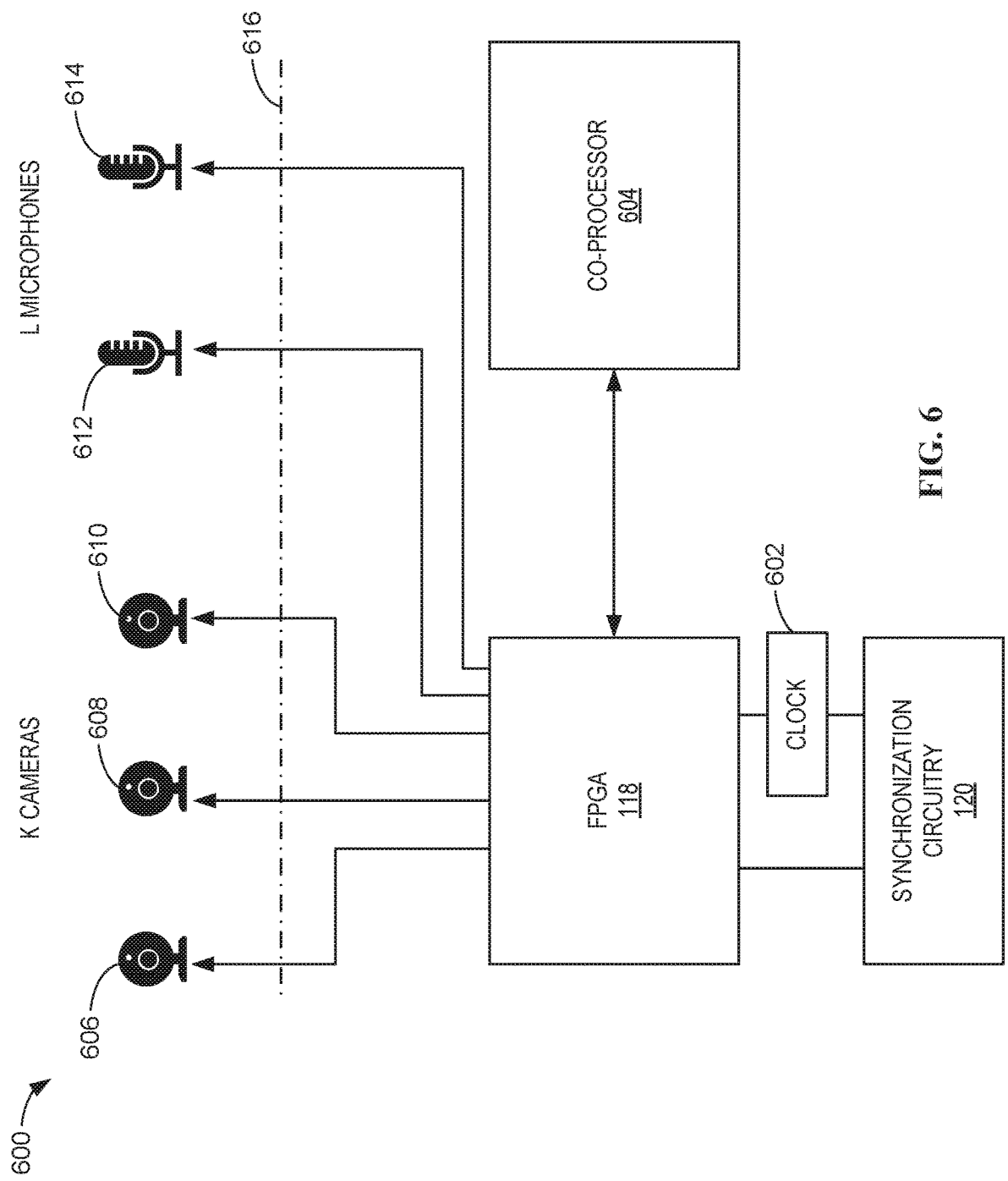
FIG. 6 is a block diagram of the example multi-device system of FIG. 1.
Figure 7:
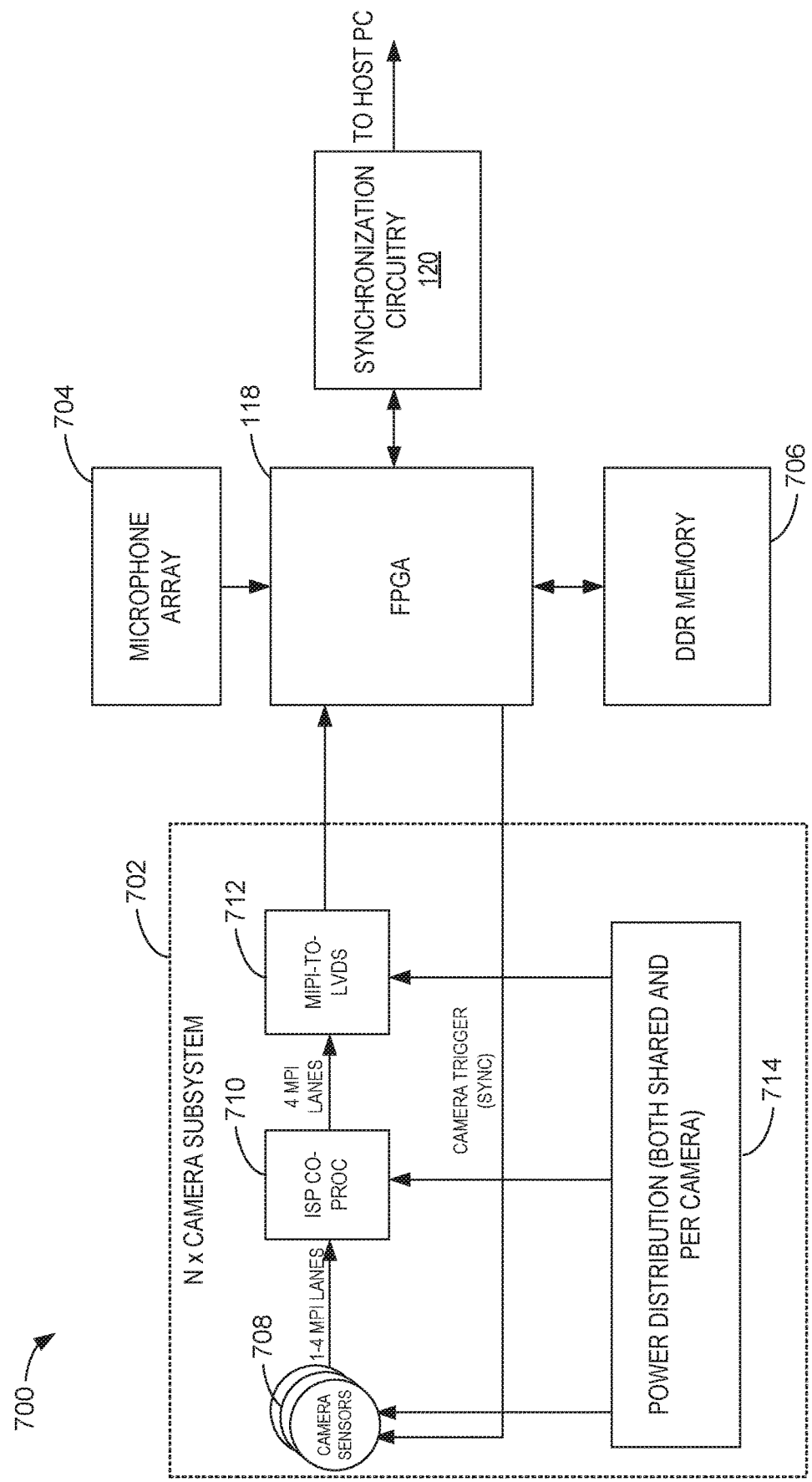
FIG. 7 is another block diagram of the example multi-device system of FIG. 1.
Figure 8:
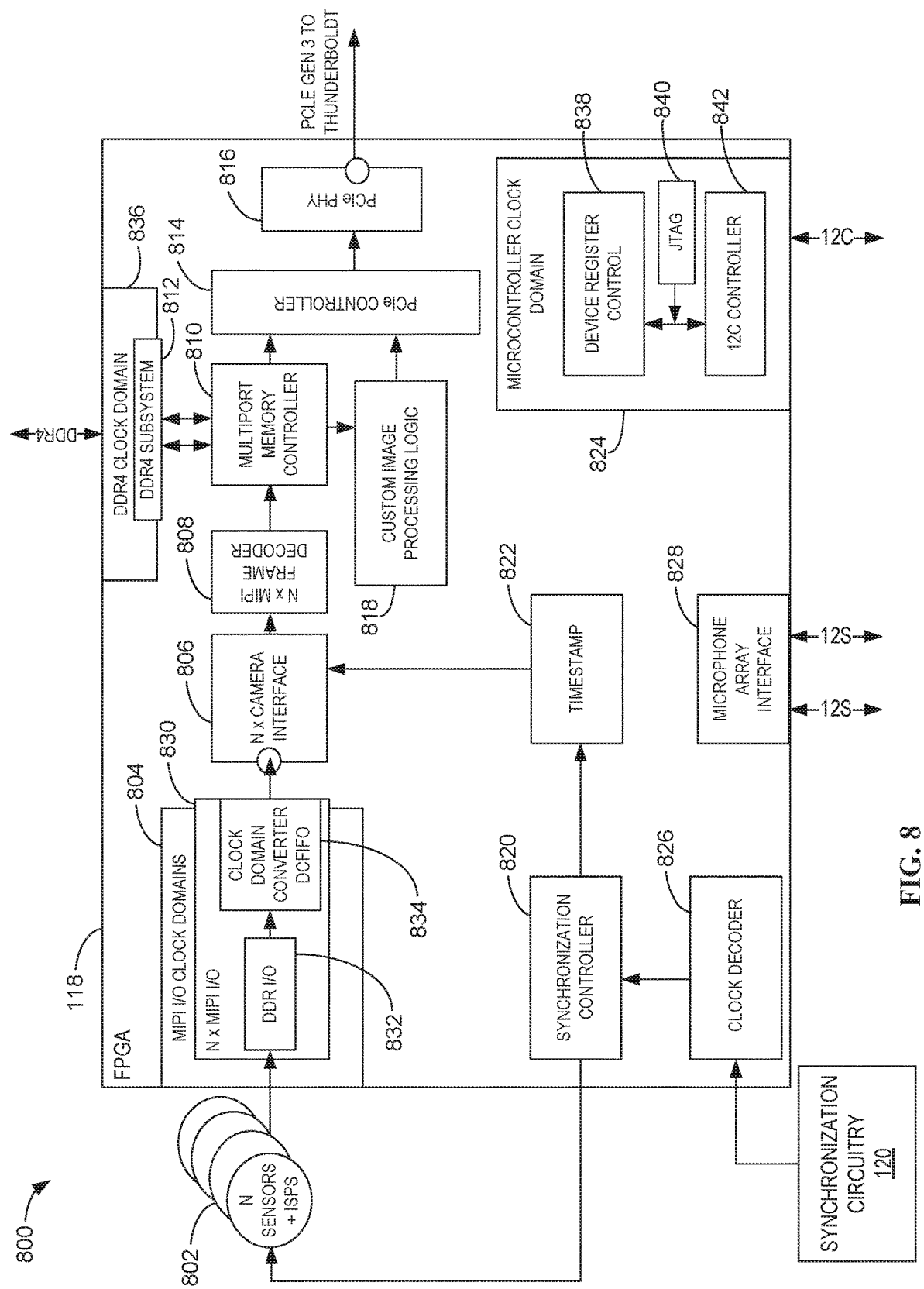
FIG. 8 is a block diagram of an example FPGA architecture constructed in accordance with the teachings of this disclosure.

FIGS. 6-8 are example configurations of the multi-device system 100 which can be implemented in examples disclosed herein. Turning to FIG. 6, an example multi-device system 600 includes the FPGA 118, the synchronization circuitry 120, a clock 602, a co-processor 604, cameras 606, 608, 610, microphones 612, 614, and trigger pulses 616. The example multi-device system 600 of FIG. 6 is similar to the example multi-device system 100 of FIG. 1, but, instead, the cameras 606, 608, 610 and the microphones 612, 614, represent the devices 106, 108, 110. Additionally or alternatively, the example multi-device system 600 includes the clock 602 for determining times associated with trigger frequencies of the cameras 606, 608, 610 and the microphones 612, 614. In some examples, the clock 602 is pulse width modulated (PWM) and provided on a single serial line to the system 600. In some examples the clock 602 is a common global clock for reference for the synchronization circuitry 120 and/or the FPGA 118. For example, the synchronization circuitry 120 can reference (e.g., utilize) the clock 602 to accurately sync the devices 606, 608, 610, 612, 614. In the example of FIG. 6, the example co-processor 604 executes image processing and/or audio processing. However, the example co-processor can be excluded from the multi-device system 600.

In the example multi-device system 600, the synchronization circuitry 120 syncs the cameras 606, 608, 610 and the microphones 612, 614 to capture media (e.g., the media 116). In some examples, each of the cameras 606, 608, 610 and each of the microphones 612, 614 can have respective trigger frequencies. The synchronization circuitry 120 can sync the trigger frequencies of the devices 606, 608, 610, 612, 614 such that images and audio of the media 116 are captured at times that satisfy the threshold (e.g., time windows <16 μs).

In FIG. 6, the example FPGA 118 can connect to each of the devices 606, 608, 610, 612, 614 via general purpose input/output (GPIO) pins. For example, each of the devices 606, 608, 610, 612, 614 can include a GPIO pin for connection to the FPGA 118. However, each of the devices 606, 608, 610, 612, 614 can connect to the FPGA 118 via one GPIO pin. The FPGA 118 sends triggers 616 (e.g., pulses) to each of the devices to instruct the devices to capture (e.g., record) media (e.g., data, the media 116).

Turning to FIG. 7, an example multi-device system 700 includes a camera subsystem 702, a microphone array 704, a Double Data Rate (DDR) memory 706, the FPGA 118, and the synchronization circuitry 120. The example multi-device system 700 of FIG. 7 is similar to the example multi-device system 600 of FIG. 6, but, instead, includes the DDR memory 706 and represents devices in the camera subsystem 702 and in the microphone array 704. The example camera subsystem 702 includes camera sensors 708, a coprocessor 710, a converter 712, and a power source 714. The example camera subsystem 702 can include any number (e.g., N) of camera sensors 708. The example coprocessor 710 controls image signal processing (ISP) as data (e.g., media 116) is transmitted from the sensors 708 to the converter 712. In some examples, the coprocessor 710 executes image compression of images captured by the sensors 708. In some examples, the converter 712 controls voltage levels of the FPGA 118 and/or the power source 714. In some examples, the converter 712 translates (e.g., manages, converts, balances, adjusts, etc.) voltages between, for example, mobile industry processor interface (MIPI) and low-voltage differential signaling (LVDS). The example power source 714 supplies power to the sensors 708, the co-processor 710, and the converter 712. In some examples, the power source 714 supplies power to each of the sensors 708. However, separate power sources can supply power to the sensors 708.

In the example multi-device system 700, the synchronization circuitry 120 syncs the sensors 708 in the camera subsystem 702 (e.g., a vision subsystem) and the microphone array 704 to capture media (e.g., the media 116). In some examples, each of the sensors 708 and microphone array 704 can have respective trigger frequencies. The synchronization circuitry 120 can sync the trigger frequencies of the devices 702, 704 such that images and audio of the media 116 are captured at times that satisfy the threshold (e.g., time windows <16 μs). Additionally or alternatively, the example multi-device system 700 can store data (e.g., the media 116, images from the sensors 708, audio from the array 704, etc.) in the DDR memory 706 (e.g., DDR Dynamic Random-Access Memory (DRAM)). In some examples, the DDR DRAM 706 can be used for data buffering. The example multi-device system 700 and/or the synchronization circuitry 120 enables frame (e.g., image) synchronization, frame alignment, daisy-chaining of multiple devices (e.g., devices 106, 108, 110, 302, the camera subsystem 702, etc.), and multi-camera (e.g., the camera subsystem 702) synchronization. Additionally or alternatively, the synchronization circuitry 120 can transfer data (e.g., media 116, images, audio, video, timestamps, etc.) to a host PC (e.g., the electronic device 102).

Turning to FIG. 8, an example multi-device system 800 includes sensors 802, the synchronization circuitry 120, and the FPGA 118. The example multi-device system 800 of FIG. 8 is similar to the example multi-device system 700 of FIG. 7, but, instead, includes components of the FPGA 118. In FIG. 8, the FPGA includes clock domains 804, a camera interface 806, a frame decoder 808, a multiport memory controller 810, a Double Data Rate 4 (DDR4) memory 812, a Peripheral Component Interconnect Express (PCIe) controller 814, a PCIe Physical Layer (PHY) 816, a custom image processing logic 818, a synchronization controller 820, a timestamp 822, a microcontroller clock domain 824, a clock decoder 826, and a microphone array interface 828. The example clock domains 804 include an MIPI I/O Board 830, a DDR I/O Board 832, and a converter 834. The example DDR4 subsystem includes a DDR4 clock domain 836. The example microcontroller clock domain 824 includes a device register control 838, a JTAG 840, and a 12C controller 842.

In FIG. 8, the sensors 802 (e.g., cameras, microphones, inertial sensors, etc.) transmit data to the FPGA 118. The example camera interface 806 and/or the example frame decoder 808 receives and deserializes MIPI data, decodes (e.g., extracts) pixel values from MIPI packets, and generates an image frame structure. The example DDR4 subsystem 812 can store the image frame structure, the pixel values, and the MIPI data in an external DRAM. The example multi-port memory controller 810 controls (e.g., manages, executes instructions, etc.) read and/or write scheduling within the FPGA 118 and input arbitration (e.g., between N cameras using a scheduler). For example, multi-port memory controller 810 can randomize (e.g., no priority, round robin, etc.) the input arbitrations corresponding to the sensors 802. In some examples, the multi-port memory controller 810 executes instructions for output (e.g., transmits) de-multiplexing to a communication controller (e.g., the custom image processing logic 818).

The example memory controller 810 transmits data (e.g., processing instructions, the media 116, etc.) to a host PC (e.g., the electronic device 102). In some examples, the memory controller 810 transmits data to a host PC via the PCIe controller 816 and/or the PCIe PHY 816. In some examples, the memory controller 910 can switch (e.g., alternate, substitute, etc.) DRAM chips for frame alignment (e.g., readout frame alignment). In some examples, the memory controller 810 resolves unbalanced data (e.g., traffic patterns at input data channels).

In some examples, the multi-device system 800 can define a threshold of 100 μs as a maximum time window between trigger frequencies corresponding the sensors 802. For example, the synced multi-device system 800 (e.g., the sensors 802) includes a time window of less than 100 μs. The example multi-device system 800 triggers each of the sensors 802 via a pulse (e.g., periodic pulse, trigger, the trigger 416, etc.) from the FPGA 118. In some examples, the pulses from the FPGA 118 are defined by a desired video framerate. For example, the example clock 602 generates the desired framerate. However, the synchronization circuitry 120 and/or a host PC (e.g., the device 102) can define (e.g., generates, calculates, etc.) the desired framerate.

The example multi-device system 800 maintains synchronization between each of the sensors 802 and the host PC (e.g., the device 102). In some examples, the PCIe controller 814 includes a submodule to read N frames from the DRAM. Thus, the PCIe controller can create a frameset of the data (e.g., the media 116). In some examples, the frameset includes synchronized data from the sensors 802 (e.g., images, audio, video, inertial data, etc.), timestamps corresponding to the data, additional metadata, etc. The example multi-device systems 100, 300, 600, 700, 800 include (e.g., output, create, generate, etc.) synchronized framesets of data (e.g., the media 116). The example multi-device systems 100, 300, 600, 700, 800 maintain consistency (e.g., safety, reliability, retention, etc.) of the framesets. For example, the framesets cannot be overwritten when a write path is overloaded in the DDR4 DRAM and/or memory associated with the device 102. Additionally or alternatively, the multi-device system 800 maintains the synchronized frameset when one of the sensors 802 includes a larger capacity and/or readout compared to a different one of the sensors 802.

The example PCIe controller 814 multiplexes different data input (e.g., from the sensors 802, raw video data, raw audio data, custom processed videos, etc.). In some examples, the PCIe controller 814 maintains the audio and video data synchronized at output (e.g., at the device 102, at the host PC, etc.) In particular, the PCIe controller 814 maintains the audio and video data synchronized when the audio and video are sampled at different rates. For example, the PCIe controller 814 synchronizes the data when the audio is sampled at 78 kiloHertz (kHz) and the video is sampled at 30 frames-per-second (fps).

Figure 9:
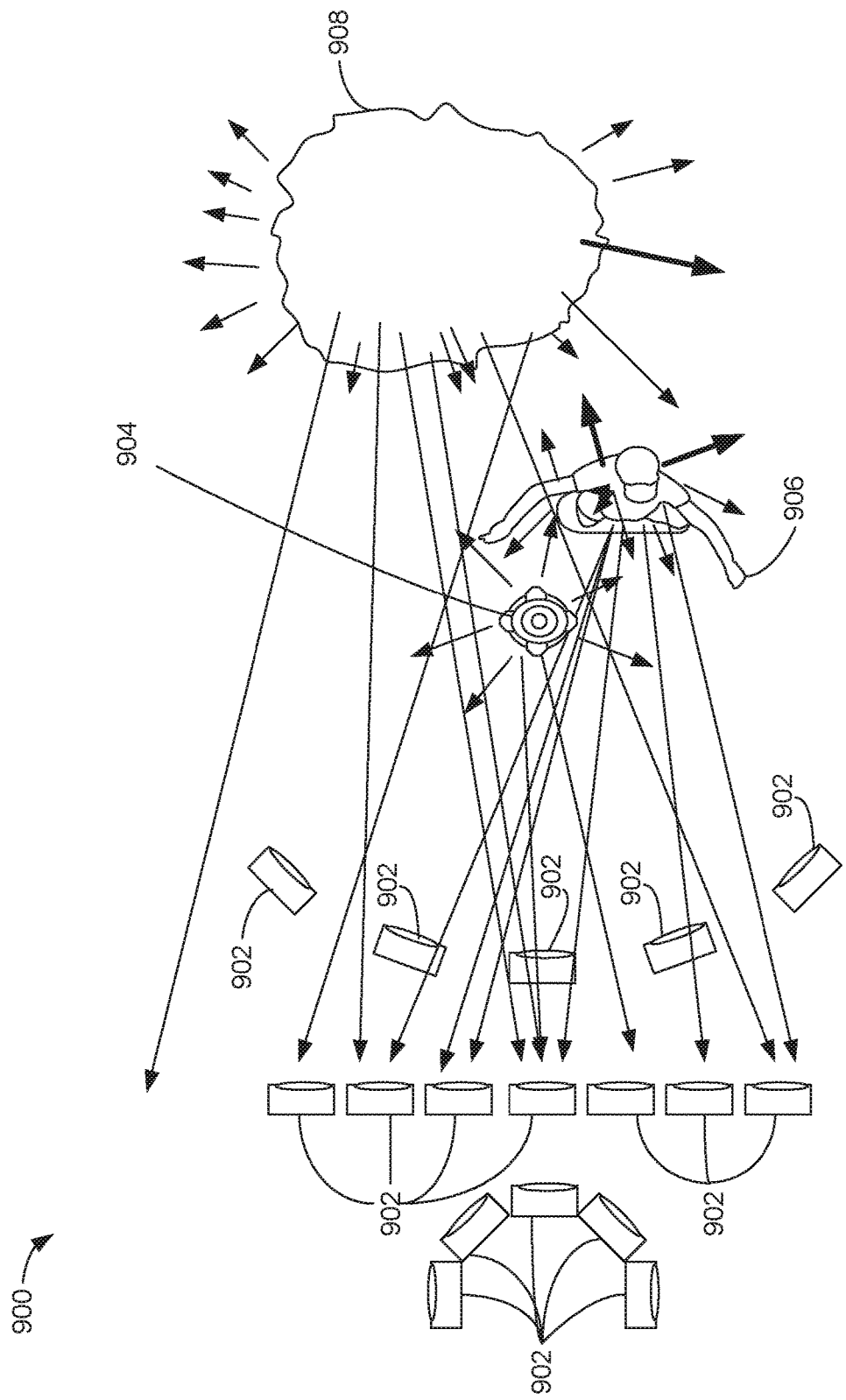
FIG. 9 is an example device setup of the multi-device system of FIG. 1.

FIG. 9 is an example device setup 900 of any of the multi-device systems 100, 300, 600, 700, 800. The example device setup 900 includes example devices 902, an example object 904, an example human subject 906, and an example tree 908. The example devices 902 can be implemented as any of the example devices of FIGS. 1-8 (e.g., the devices 106, 108, 110, 302, the cameras 606, 608, 610, the microphones 612, 614, the camera sensors 708, the camera subsystem 702, the microphone array 704, the sensors 802, etc.). The example devices 902 are positioned to view an environment including the object 904, the human subject 906, and the tree 908. For example, in a first example arrangement, the devices 902 are arranged in a convex half circle (e.g., inside out 360 degree setup). In some examples, the first example arrangement can be used in panoramic imaging. In a second example arrangement, the devices 902 are arranged linearly (e.g., planar arrangement). In some examples, the second example arrangement can be included in mobile phones. In a third example arrangement, the devices 902 are arranged in a concave half circle (e.g., outside-in setup). In some examples, the third example arrangement can be used in 3D object capture and scanning. The example devices 902 can be synchronized via the synchronization circuitry 120. Additionally or alternatively, the example devices 902 can be included in any of the example multi-device systems 100, 300, 600, 700, 800.

Figure 10:
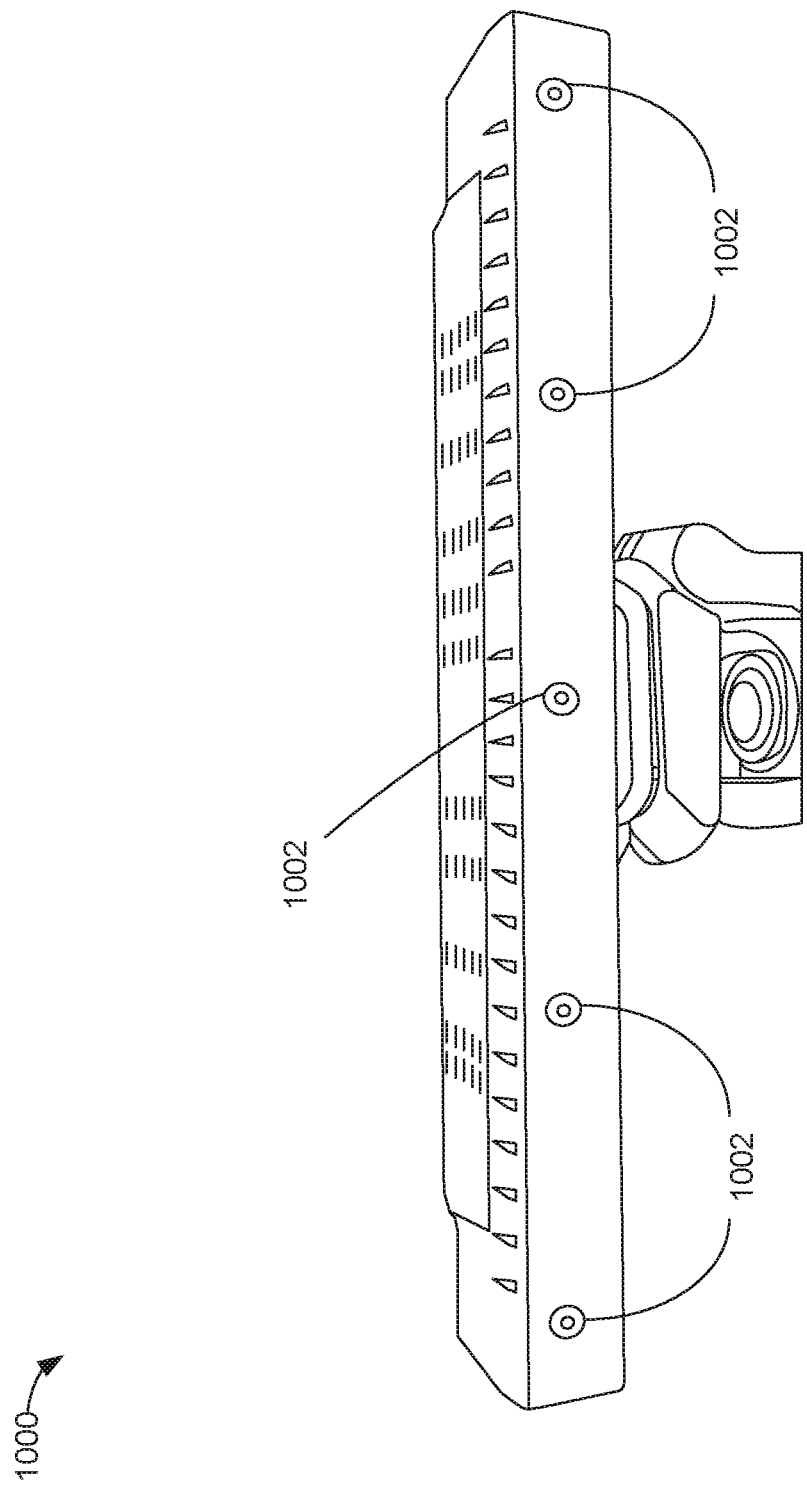
FIGS. 10 and 11 illustrate an example device that can be implemented by the example synchronization circuitry of FIG. 2.
Figure 11:
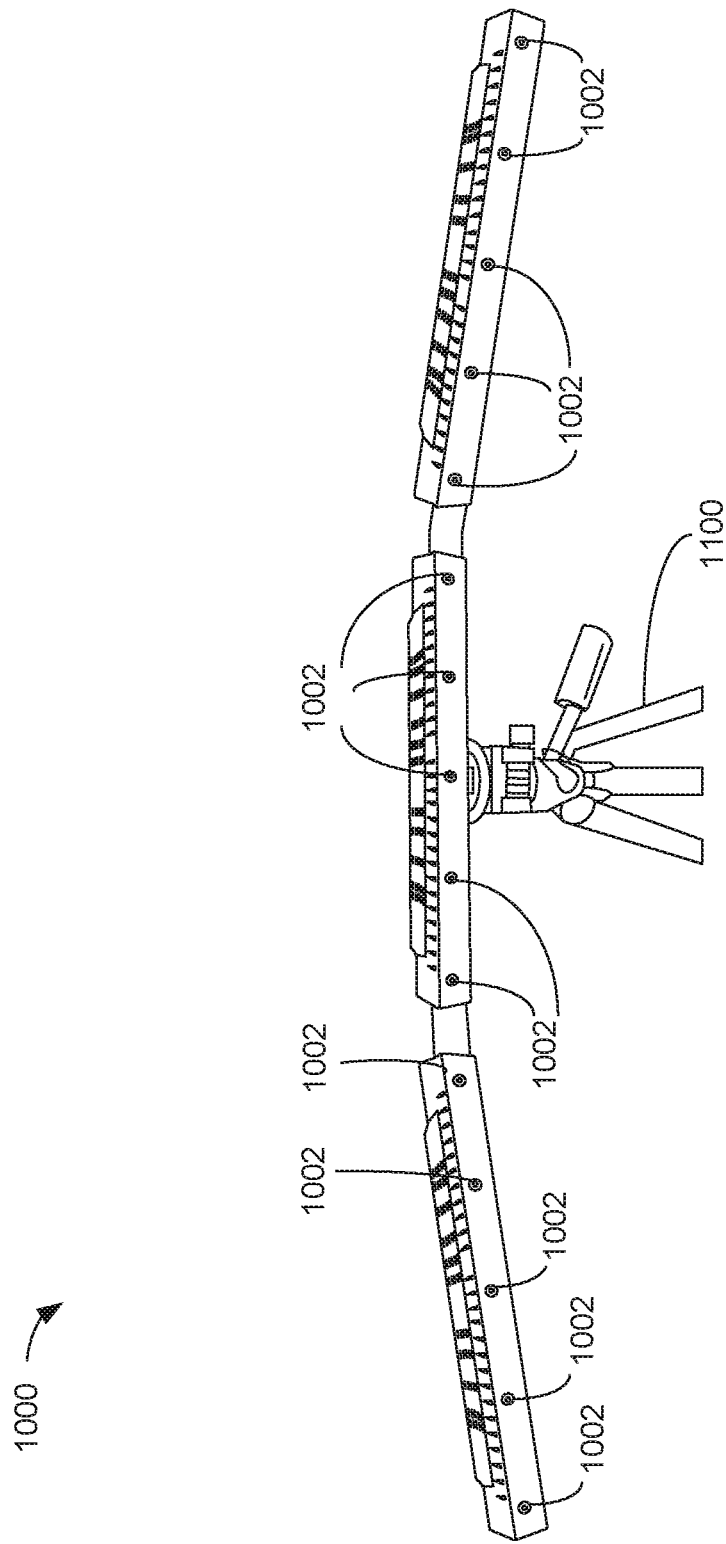

FIGS. 10 and 11 illustrate an example device 1000 that can be implemented by the example synchronization circuitry 120 of FIG. 2. The example device 1000 includes example camera sensors 1002. In some examples, the example camera sensors can be included in any of the multi-device systems 100, 300, 600, 700, 800. Turning to FIG. 10, the example device 1000 is an example single multi-camera device 1000 including the cameras 1002. Turning to FIG. 11, the example device 1000 is an expanded version of the device 1000 shown in FIG. 10. In FIG. 11, the example device 1000 includes three segments mounted on a tripod 1100. In some examples, any number of devices 1000 with any number of cameras 1002 can be connected. In some examples, the device 1000 can be a group of daisy chained devices 1000.

Figure 12:
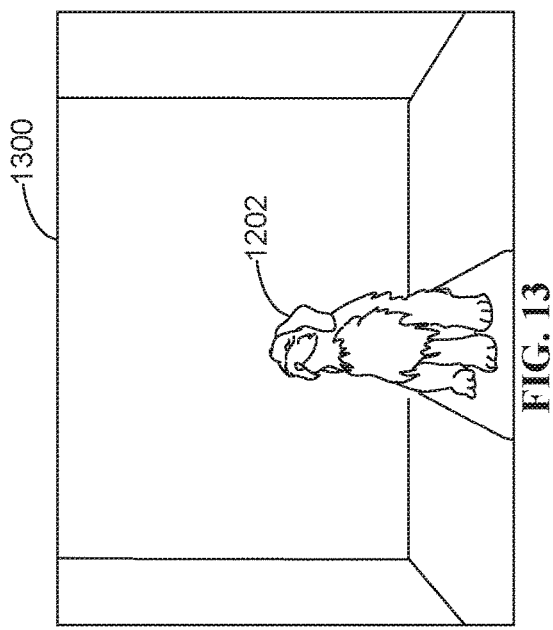
FIGS. 12-14 illustrate example images from the example multi-device system of FIG. 1.
Figure 13:
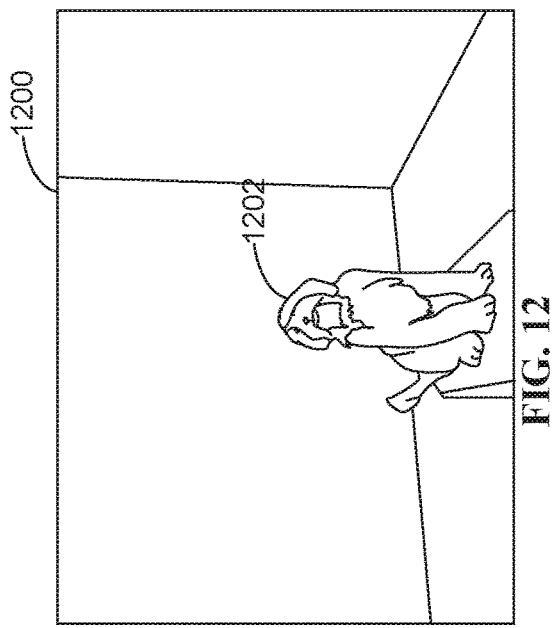
Figure 14:
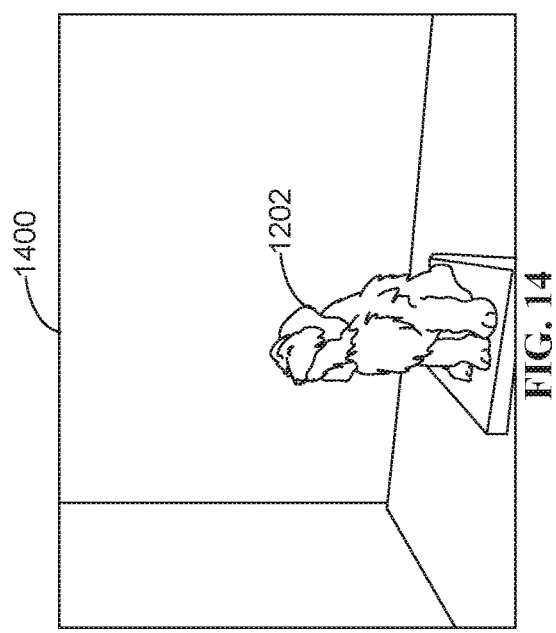

FIGS. 12-14 illustrate example images 1200, 1300, 1400 from any of the multi-device systems 100, 300, 600, 700, 800. The example image 1200 illustrates a first perspective of a dog 1202 captured by any of the cameras 106, 108, 110, 302, 606, 608, 610, 708, 802, 902. The example image 1300 illustrates a second perspective view of the dog 1202 captured by any of the cameras 106, 108, 110, 302, 606, 608, 610, 708, 802, 902. The example image 1400 illustrates a third perspective view of the dog 1202 captured by any of the cameras 106, 108, 110, 302, 606, 608, 610, 708, 802, 902. In some examples, the images 1200, 1300, 1400 are synced via the example synchronization circuitry 120. However, the images 1200, 1300, 1400 can be outputs of any of the example multi-device systems 100, 300, 600, 700, 800.

While an example manner of implementing the synchronization circuitry 120 of FIG. 1 is illustrated in FIG. 2, one or more of the elements, processes, and/or devices illustrated in FIG. 2 may be combined, divided, re-arranged, omitted, eliminated, and/or implemented in any other way. Further, the example image capture circuitry 200, the example identification circuitry 202, the example adjustment circuitry 204, the example frequency determination circuitry 206, the example audio recording circuitry 208 and/or, more generally, the example synchronization circuitry 120 of FIG. 1, may be implemented by hardware alone or by hardware in combination with software and/or firmware. Thus, for example, any of the example image capture circuitry 200, the example identification circuitry 202, the example adjustment circuitry 204, the example frequency determination circuitry 206, the example audio recording circuitry 208, and/or, more generally, the example synchronization circuitry 120, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example synchronization circuitry 120 of FIG. 1 may include one or more elements, processes, and/or devices in addition to, or instead of, those illustrated in FIG. 2, and/or may include more than one of any or all of the illustrated elements, processes and devices.

Figure 15:
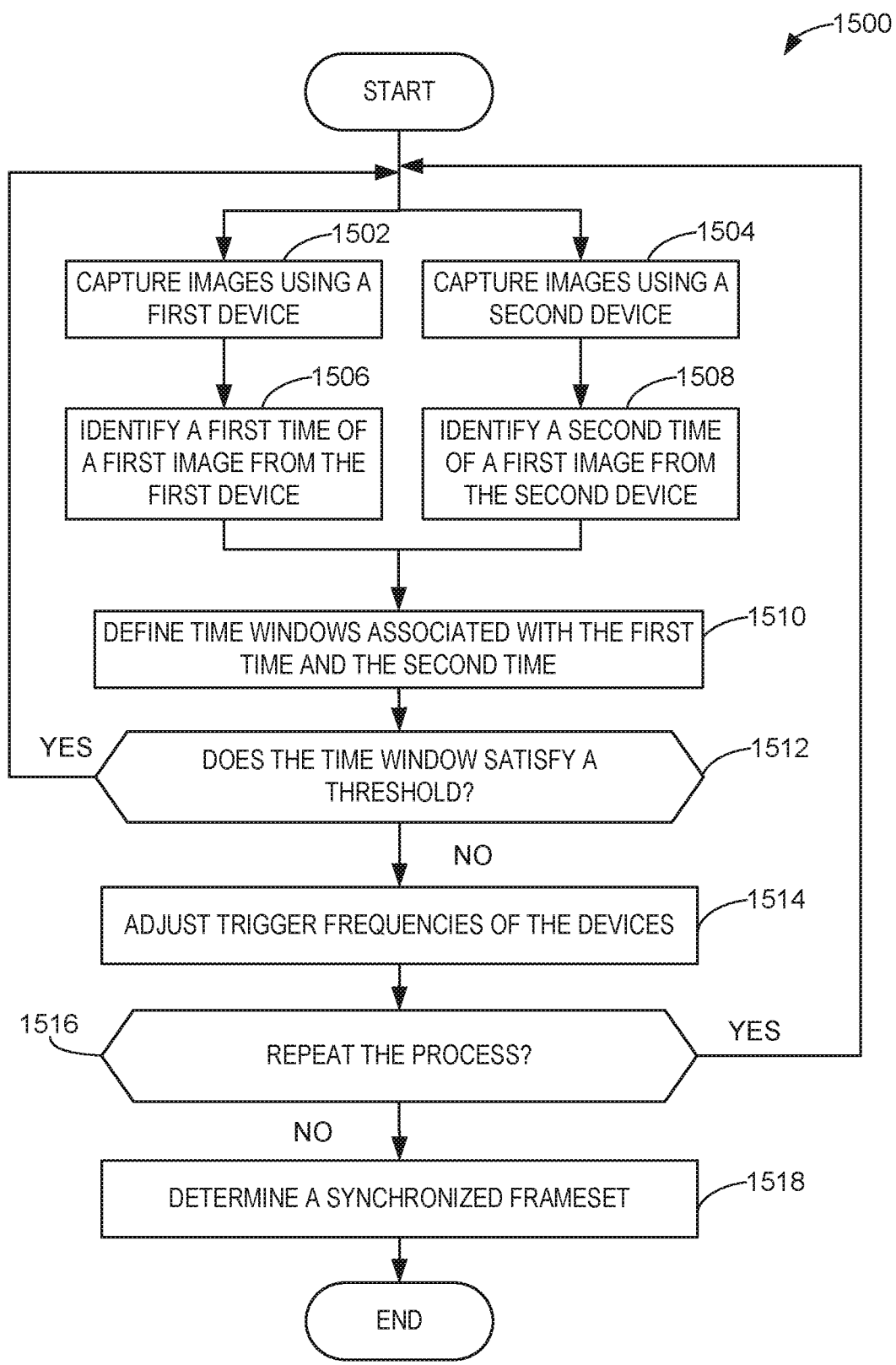
FIG. 15 is a flowchart representative of example machine readable instructions and/or example operations that may be executed by example processor circuitry to implement the example synchronization circuitry of FIG. 2.
Figure 16:
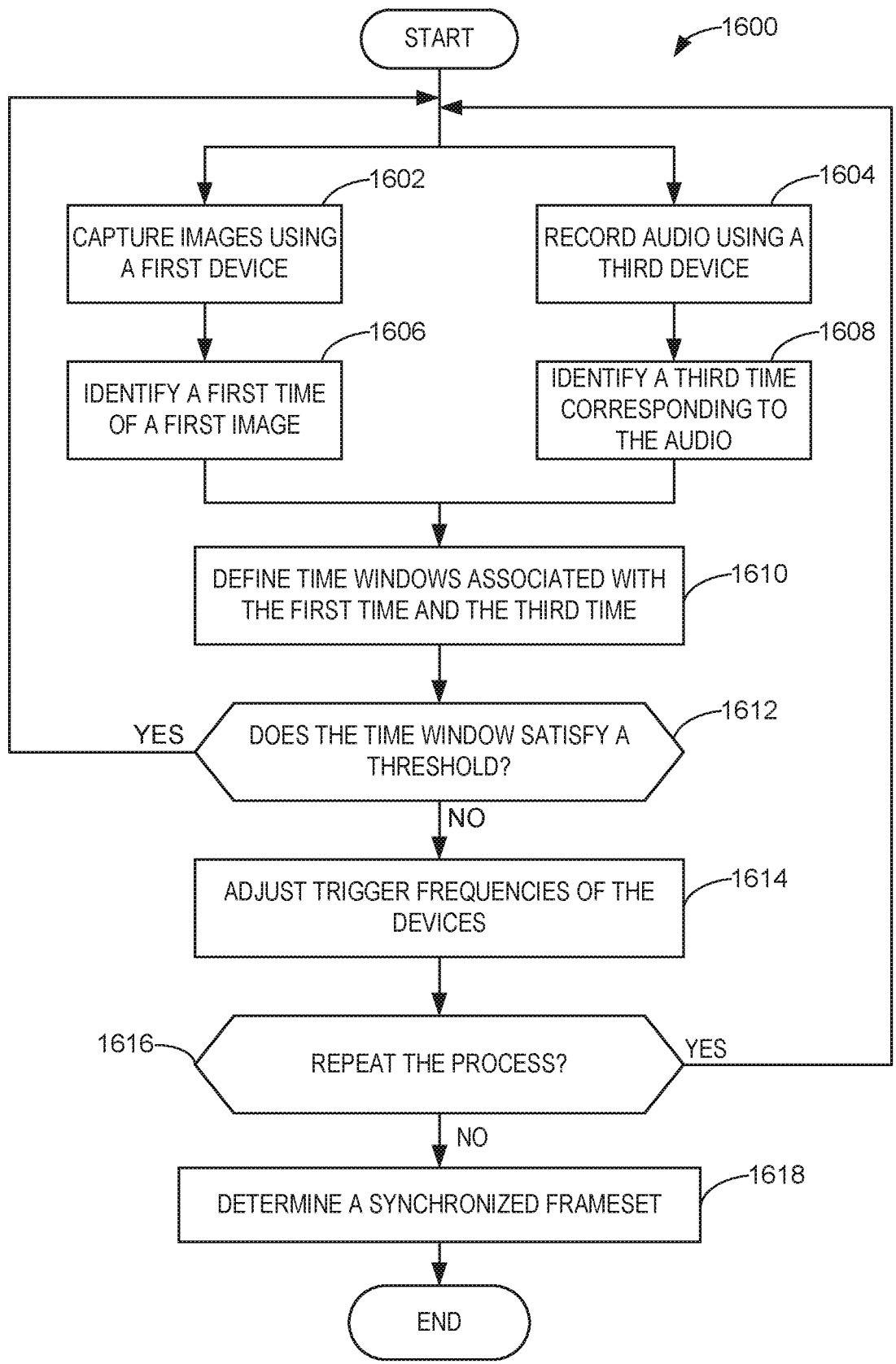
FIG. 16 is a flowchart representative of example machine readable instructions and/or example operations that may be executed by example processor circuitry to implement the example synchronization circuitry of FIG. 2.

Flowcharts representative of example hardware logic circuitry, machine readable instructions, hardware implemented state machines, and/or any combination thereof for implementing the synchronization circuitry 120 of FIG. 2 is shown in FIGS. 15 and 16. The machine readable instructions may be one or more executable programs or portion(s) of an executable program for execution by processor circuitry, such as the processor circuitry 1712 shown in the example processor platform 1700 discussed below in connection with FIG. 17 and/or the example processor circuitry discussed below in connection with FIG. 18 and/or 19. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 15 and 16, many other methods of implementing the example synchronization circuitry 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 15 and 16 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 15 is a flowchart representative of example machine readable instructions and/or example operations 1500 that may be executed and/or instantiated by processor circuitry to sync devices of a multi-device system. The machine readable instructions and/or the operations 1500 of FIG. 15 begin at block 1502, at which the image capture circuitry 200 captures first images using a first device. In some examples, the image capture circuitry 200 captures first images of the media 116 using the device 106. In some examples, the image capture circuitry 200 captures images with the device 106 having the first trigger frequency 406. In some examples, the image capture circuitry 200 captures the first images according to the first trigger frequency 406.

At block 1504, the image capture circuitry 200 captures second images using a second device. In some examples, the image capture circuitry 200 captures second images of the media 116 using the device 108. In some examples, the image capture circuitry 200 captures images with the device 108 having the second trigger frequency 408. In some examples, the image capture circuitry 200 captures the second images according to the second trigger frequency 408. In some examples, the first trigger frequency 406 is different from the second trigger frequency 408. In some examples, the first images from the first camera 106 are different from the second images from the second camera 108. In some examples, the devices 106, 108 are positioned at different angles with respect to the media 116.

At block 1506, the example identification circuitry 202 identifies a first time corresponding to a first one of the first images from the first device. In some examples, the different trigger frequencies 406, 408 associated with the devices 106, 108 capture images at different times. For example, the example identification circuitry 202 can identify a time $2T_1$ corresponding to a first one of the first images captured with the device 106. In particular, the time $2T_1$ on the example timeline 404 corresponds to an image captured by the device 106.

At block 1508, the example identification circuitry 202 identifies a second time corresponding to a first one of the second images from the second device. In some examples, the different trigger frequencies 406, 408 associated with the devices 106, 108 capture images at different times. For example, the example identification circuitry 202 can identify a time $2T_2$ corresponding to a first one of the second images captured with the device 108. In particular, the time $2T_2$ on the example timeline 404 corresponds to an image captured by the device 108.

At block 1510, the example identification circuitry 202 defines time windows associated with the first time and the second time. For example, the example identification circuitry defines the time window 410 between the first time $2T_1$ and the second time $2T_2$ on the example timeline 404. In some examples, the time window (e.g., the time window 410) can be a number of time units (e.g., seconds, microseconds, etc.).

At block 1512, the example identification circuitry 202 determines whether the time window satisfies a threshold. If the time window satisfies a threshold (1512) the process returns to blocks 1502, 1504. If the time window does not satisfy a threshold (1512) the process proceeds to block 1514.

At block 1514, the example adjustment circuitry 204 adjusts trigger frequencies of the devices. For example, the example adjustment circuitry 204 adjusts (e.g., changes, increases, decreases, etc.) the trigger frequency of at least one of the devices 106, 108. In some examples, the adjustment circuitry 204 increases the trigger frequency 408 of the device 108 such that the time window 410 satisfies a threshold (e.g., 10 µs). For example, the first time window 410 can be 15 µs. The example identification circuitry 202 identifies the 15 µs time window 410. Accordingly, the example adjustment circuitry 204 increases the trigger frequency 408 by 15 µs such that, at a subsequent time (e.g., $3T_1$) the time window (e.g., the time window 414) satisfies the threshold (e.g., less than 10 µs).

At block 1516, it is determined whether to repeat the process. If the process is to be repeated (1516), the process returns to blocks 1502, 1504. If the process is not to be repeated (1516), the process proceeds to block 1518.

At block 1518, the example frequency determination circuitry 206 determines a synchronized frameset. For example, the frequency determination circuitry 206 determines (e.g., creates, generates, etc.) a synchronized frameset from the images captured via the devices 106, 108 at the adjusted trigger frequency. In some examples, the frequency determination circuitry 206 transmits the synchronized frameset to the electronic device 102 (e.g., a host PC, DRAM, etc.)

FIG. 16 is a flowchart representative of example machine readable instructions and/or example operations 1600 that may be executed and/or instantiated by processor circuitry to sync devices of a multi-device system. The machine readable instructions and/or the operations 1600 of FIG. 16 begin at block 1602, at which the image capture circuitry 200 captures first images using a first device. In some examples, the image capture circuitry 200 captures first images of the media 116 using the device 106. In some examples, the image capture circuitry 200 captures images with the device 106 having the first trigger frequency 406. In some examples, the image capture circuitry 200 captures the first images according to the first trigger frequency 406.

At block 1604, the audio recording circuitry 208 record audio using a second device. In some examples, the audio recording circuitry 208 records audio of the media 116 using the device 110. In some examples, the audio recording circuitry 208 records audio with the device 110 having a third trigger frequency. In some examples, the audio recording circuitry 208 records the audio according to the third trigger frequency. In some examples, the first trigger frequency 406 is different from the third trigger frequency. In some examples, the first images from the first camera 106 correspond to different times of the audio recorded by the device 110 (e.g., the microphone 612, the microphone 614, etc.). In some examples, the devices 106, 110 are positioned at different angles with respect to the media 116.

At block 1606, the example identification circuitry 202 identifies a first time corresponding to a first one of the first images from the first device. In some examples, the first trigger frequency 406 associated with the device 106 captures images at different times than the third trigger frequency associated with the device 110 records audio. For example, the example identification circuitry 202 can identify a time $2T_1$ corresponding to a first one of the first images captured with the device 106. In particular, the time $2T_1$ on the example timeline 404 corresponds to an image captured by the device 106.

At block 1608, the example identification circuitry 202 identifies a third time corresponding to the audio from the third device. In some examples, the first trigger frequency 406 associated with the device 106 captures images at different times than the third trigger frequency associated with the device 110 records audio. For example, the example identification circuitry 202 can identify a time $2T_2$ corresponding to audio recorded with the device 108. In particular, the time $2T_2$ on the example timeline 404 corresponds to audio recorded by the device 110.

At block 1610, the example identification circuitry 202 defines time windows associated with the first time and the third time. For example, the example identification circuitry defines the time window 410 between the first time $2T_1$ and the third time $2T_2$ on the example timeline 404. In some examples, the time window (e.g., the time window 410) can be a number of time units (e.g., seconds, microseconds, etc.).

At block 1612, the example identification circuitry 202 determines whether the time window satisfies a threshold. If the time window satisfies a threshold (1612) the process returns to blocks 1602, 1604. If the time window does not satisfy a threshold (1612) the process proceeds to block 1614.

At block 1614, the example adjustment circuitry 204 adjusts trigger frequencies of the devices. For example, the example adjustment circuitry 204 adjusts (e.g., changes, increases, decreases, etc.) the trigger frequency of at least one of the devices 106, 110. In some examples, the adjustment circuitry 204 increases the third trigger frequency of the device 110 such that the time window 410 satisfies a threshold (e.g., 10 µs). For example, the first time window 410 can be 15 µs. The example identification circuitry 202 identifies the 15 µs time window 410. Accordingly, the example adjustment circuitry 204 increases the trigger frequency 408 by 15 µs such that, at a subsequent time (e.g., $3T_1$) the time window (e.g., the time window 414) satisfies the threshold (e.g., less than 10 µs).

At block 1616, it is determined whether to repeat the process. If the process is to be repeated (1616), the process returns to blocks 1602, 1604. If the process is not to be repeated (1616), the process proceeds to block 1618.

At block 1618, the example frequency determination circuitry 206 determines a synchronized frameset. For example, the frequency determination circuitry 206 determines (e.g., creates, generates, etc.) a synchronized frameset from the images captured via the devices 106 and the audio recorded via the device 110 at the adjusted trigger frequency. In some examples, the frequency determination circuitry 206 transmits the synchronized frameset to the electronic device 102 (e.g., a host PC, DRAM, etc.)

Figure 17:
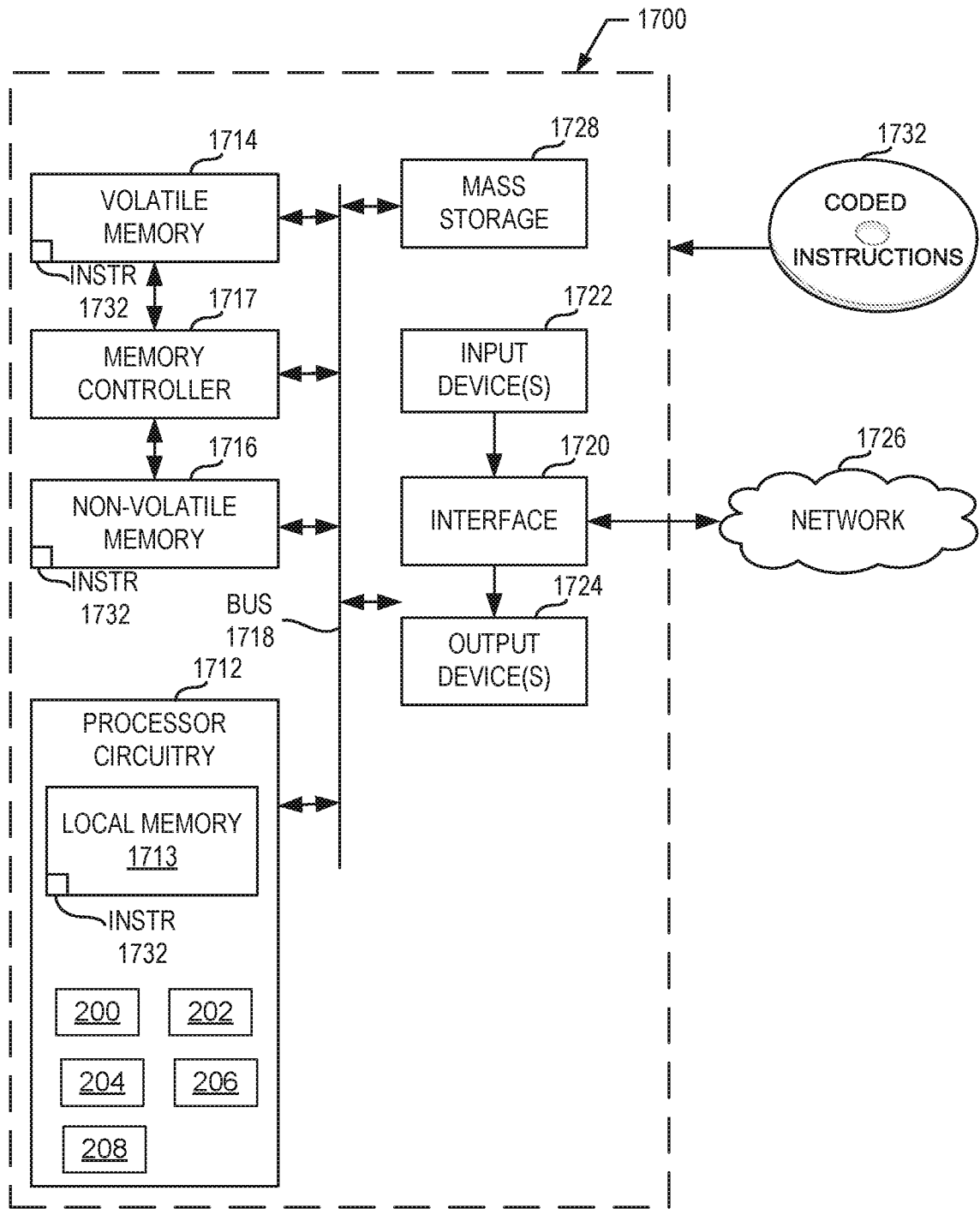
FIG. 17 is a block diagram of an example processing platform including processor circuitry structured to execute the example machine readable instructions and/or the example operations of FIG. 15 to implement the example synchronization circuitry of FIG. 2.

FIG. 17 is a block diagram of an example processor platform 1700 structured to execute and/or instantiate the machine readable instructions and/or the operations of FIGS. 15 and 16 to implement the synchronization circuitry 120 of FIGS. 1 and 2. The processor platform 1700 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1700 of the illustrated example includes processor circuitry 1712. The processor circuitry 1712 of the illustrated example is hardware. For example, the processor circuitry 1712 can be implemented by one or more integrated circuits, logic circuits, FPGAs, microprocessors, CPUs, GPUs, DSPs, and/or microcontrollers from any desired family or manufacturer. The processor circuitry 1712 may be implemented by one or more semiconductor based (e.g., silicon based) devices. In this example, the processor circuitry 1712 implements the example image capture circuitry 200, the example identification circuitry 202, the example adjustment circuitry 204, the example audio recording circuitry 208, the example frequency determination circuitry 206, and/or, more generally the example synchronization circuitry 120.

The processor circuitry 1712 of the illustrated example includes a local memory 1713 (e.g., a cache, registers, etc.). The processor circuitry 1712 of the illustrated example is in communication with a main memory including a volatile memory 1714 and a non-volatile memory 1716 by a bus 1718. The volatile memory 1714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1716 may be implemented by flash memory and/or any other desired type of memory device. Access to the main memory 1714, 1716 of the illustrated example is controlled by a memory controller 1717.

The processor platform 1700 of the illustrated example also includes interface circuitry 1720. The interface circuitry 1720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1722 are connected to the interface circuitry 1720. The input device(s) 1722 permit(s) a user to enter data and/or commands into the processor circuitry 1712. The input device(s) 1722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1724 are also connected to the interface circuitry 1720 of the illustrated example. The output device(s) 424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1720 of the illustrated example, thus, typically includes a graphics driver card, a graphics driver chip, and/or graphics processor circuitry such as a GPU.

The interface circuitry 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1700 of the illustrated example also includes one or more mass storage devices 1728 to store software and/or data. Examples of such mass storage devices 1728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1732, which may be implemented by the machine readable instructions of FIGS. 15 and 16 may be stored in the mass storage device 1728, in the volatile memory 1714, in the non-volatile memory 1716, and/or on a removable non-transitory computer readable storage medium such as a CD or DVD.

Figure 18:
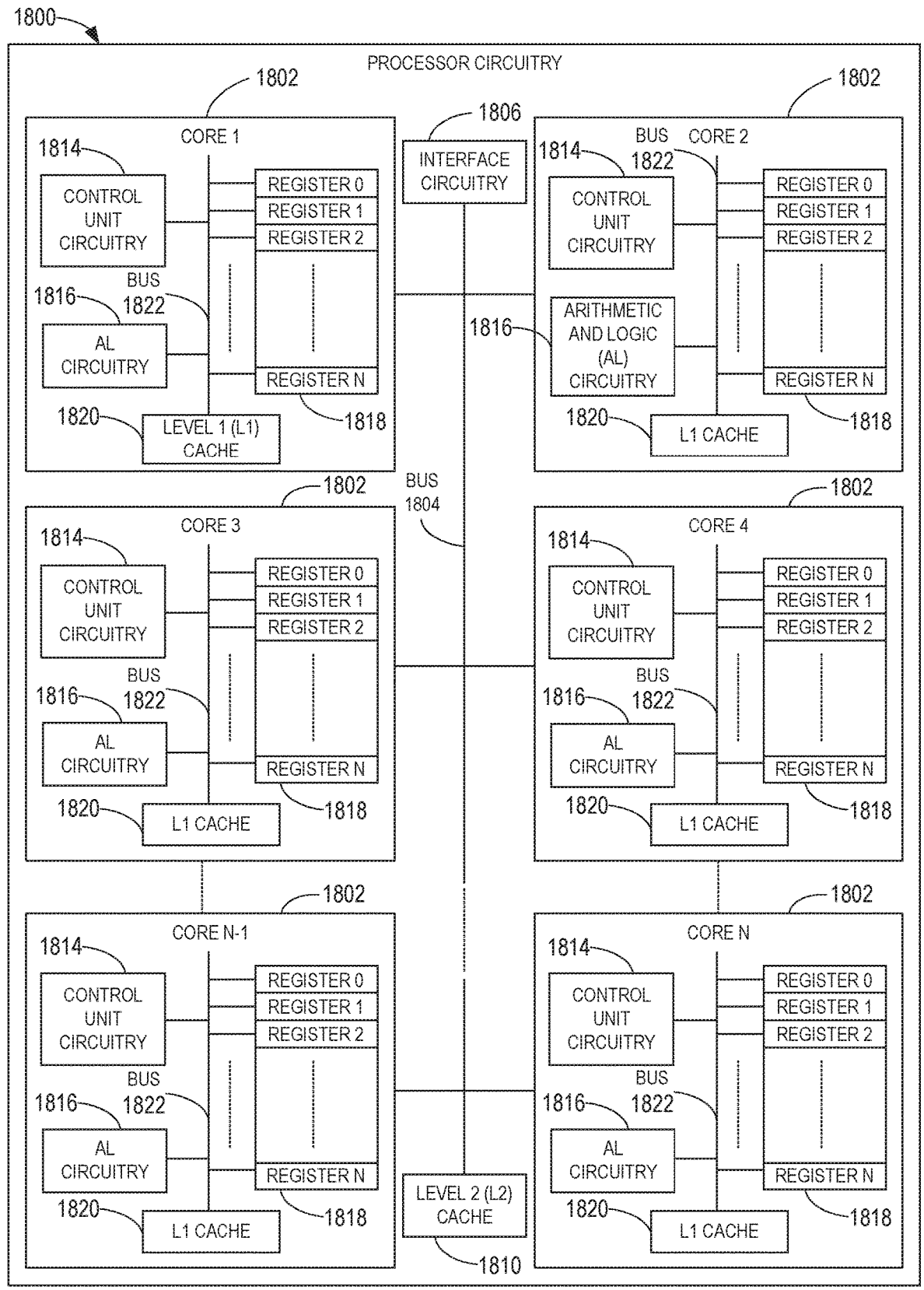
FIG. 18 is a block diagram of an example implementation of the processor circuitry of FIG. 16.

FIG. 18 is a block diagram of an example implementation of the processor circuitry 1712 of FIG. 17. In this example, the processor circuitry 1712 of FIG. 17 is implemented by a general purpose microprocessor 1800. The general purpose microprocessor circuitry 1800 executes some or all of the machine readable instructions of the flowcharts of FIGS. 15 and 16 to effectively instantiate the circuitry of FIG. 2 as logic circuits to perform the operations corresponding to those machine readable instructions. In some such examples, the circuitry of FIG. 2 is instantiated by the hardware circuits of the microprocessor 1800 in combination with the instructions. For example, the microprocessor 1800 may implement multi-core hardware circuitry such as a CPU, a DSP, a GPU, an XPU, etc. Although it may include any number of example cores 1802 (e.g., 1 core), the microprocessor 1800 of this example is a multi-core semiconductor device including N cores. The cores 1802 of the microprocessor 1800 may operate independently or may cooperate to execute machine readable instructions. For example, machine code corresponding to a firmware program, an embedded software program, or a software program may be executed by one of the cores 1802 or may be executed by multiple ones of the cores 1802 at the same or different times. In some examples, the machine code corresponding to the firmware program, the embedded software program, or the software program is split into threads and executed in parallel by two or more of the cores 1802. The software program may correspond to a portion or all of the machine readable instructions and/or operations represented by the flowcharts of FIGS. 15 and 16.

The cores 1802 may communicate by a first example bus 1804. In some examples, the first bus 1804 may implement a communication bus to effectuate communication associated with one(s) of the cores 1802. For example, the first bus 1804 may implement at least one of an Inter-Integrated Circuit (I2C) bus, a Serial Peripheral Interface (SPI) bus, a PCI bus, or a PCIe bus. Additionally or alternatively, the first bus 1804 may implement any other type of computing or electrical bus. The cores 1802 may obtain data, instructions, and/or signals from one or more external devices by example interface circuitry 1806. The cores 1802 may output data, instructions, and/or signals to the one or more external devices by the interface circuitry 1806. Although the cores 1802 of this example include example local memory 1820 (e.g., Level 1 (L1) cache that may be split into an L1 data cache and an L1 instruction cache), the microprocessor 1800 also includes example shared memory 1810 that may be shared by the cores (e.g., Level 2 (L2_cache)) for high-speed access to data and/or instructions. Data and/or instructions may be transferred (e.g., shared) by writing to and/or reading from the shared memory 1810. The local memory 1820 of each of the cores 1802 and the shared memory 1810 may be part of a hierarchy of storage devices including multiple levels of cache memory and the main memory (e.g., the main memory 1714, 1716 of FIG. 17). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1802 may be referred to as a CPU, DSP, GPU, etc., or any other type of hardware circuitry. Each core 1802 includes control unit circuitry 1814, arithmetic and logic (AL) circuitry (sometimes referred to as an ALU) 1816, a plurality of registers 1818, the L1 cache 1820, and a second example bus 1822. Other structures may be present. For example, each core 1802 may include vector unit circuitry, single instruction multiple data (SIMD) unit circuitry, load/store unit (LSU) circuitry, branch/jump unit circuitry, floating-point unit (FPU) circuitry, etc. The control unit circuitry 1814 includes semiconductor-based circuits structured to control (e.g., coordinate) data movement within the corresponding core 1802. The AL circuitry 1816 includes semiconductor-based circuits structured to perform one or more mathematic and/or logic operations on the data within the corresponding core 1802. The AL circuitry 1816 of some examples performs integer based operations. In other examples, the AL circuitry 1816 also performs floating point operations. In yet other examples, the AL circuitry 1816 may include first AL circuitry that performs integer based operations and second AL circuitry that performs floating point operations. In some examples, the AL circuitry 1816 may be referred to as an Arithmetic Logic Unit (ALU). The registers 1818 are semiconductor-based structures to store data and/or instructions such as results of one or more of the operations performed by the AL circuitry 1816 of the corresponding core 1802. For example, the registers 1818 may include vector register(s), SIMD register(s), general purpose register(s), flag register(s), segment register(s), machine specific register(s), instruction pointer register(s), control register(s), debug register(s), memory management register(s), machine check register(s), etc. The registers 1818 may be arranged in a bank as shown in FIG. 18. Alternatively, the registers 1818 may be organized in any other arrangement, format, or structure including distributed throughout the core 1802 to shorten access time. The second bus 1822 may implement at least one of an I2C bus, a SPI bus, a PCI bus, or a PCIe bus.

Each core 1802 and/or, more generally, the microprocessor 1800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 19:
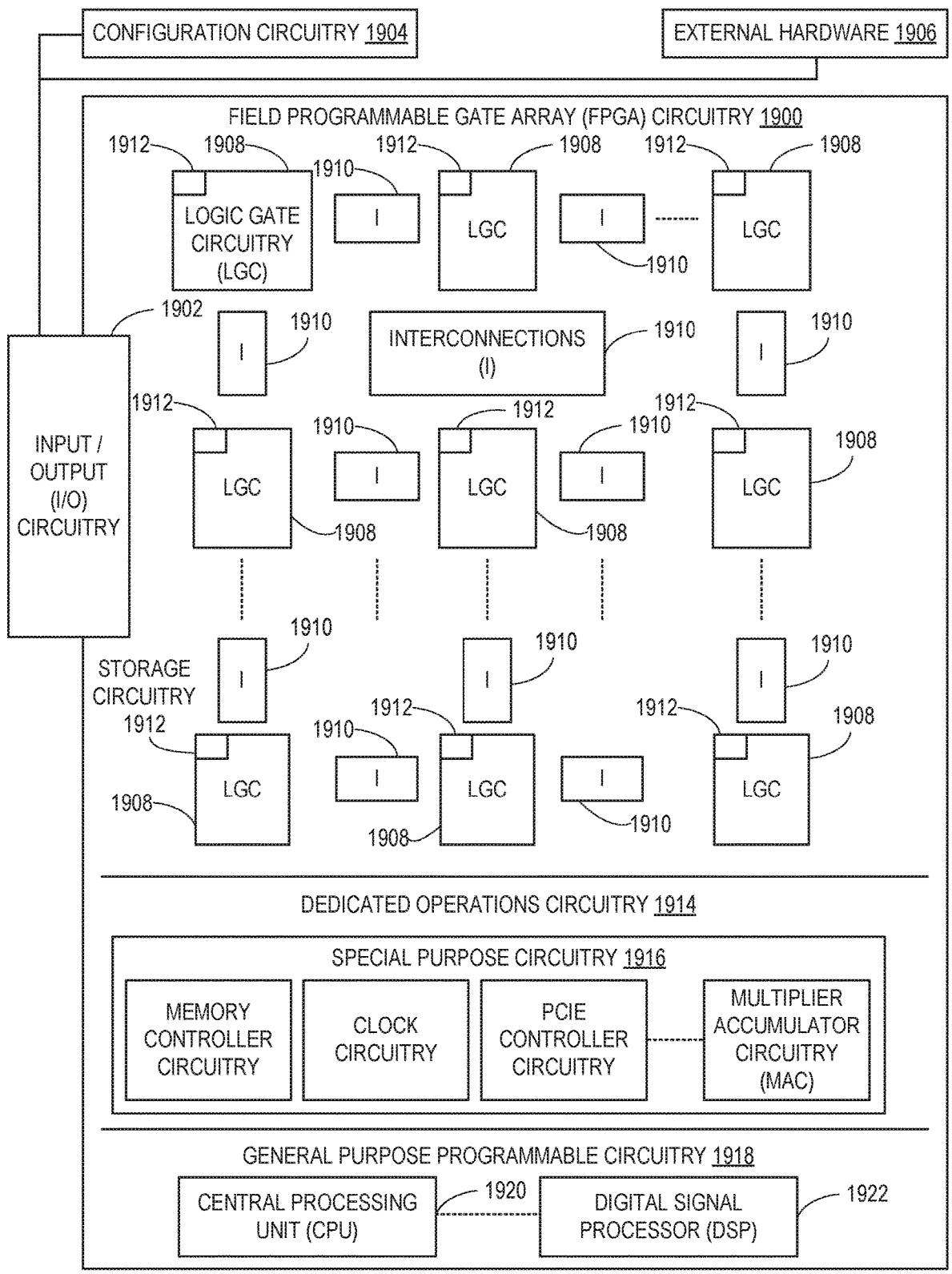
FIG. 19 is a block diagram of another example implementation of the processor circuitry of FIG. 16.

FIG. 19 is a block diagram of another example implementation of the processor circuitry 1712 of FIG. 17. In this example, the processor circuitry 1712 is implemented by FPGA circuitry 1900. The FPGA circuitry 1900 can be used, for example, to perform operations that could otherwise be performed by the example microprocessor 1800 of FIG. 18 executing corresponding machine readable instructions. However, once configured, the FPGA circuitry 1900 instantiates the machine readable instructions in hardware and, thus, can often execute the operations faster than they could be performed by a general purpose microprocessor executing the corresponding software.

More specifically, in contrast to the microprocessor 1800 of FIG. 18 described above (which is a general purpose device that may be programmed to execute some or all of the machine readable instructions represented by the flowcharts of FIGS. 15 and 16 but whose interconnections and logic circuitry are fixed once fabricated), the FPGA circuitry 1900 of the example of FIG. 19 includes interconnections and logic circuitry that may be configured and/or interconnected in different ways after fabrication to instantiate, for example, some or all of the machine readable instructions represented by the flowcharts of FIGS. 15 and 16. In particular, the FPGA 1900 may be thought of as an array of logic gates, interconnections, and switches. The switches can be programmed to change how the logic gates are interconnected by the interconnections, effectively forming one or more dedicated logic circuits (unless and until the FPGA circuitry 1900 is reprogrammed). The configured logic circuits enable the logic gates to cooperate in different ways to perform different operations on data received by input circuitry. Those operations may correspond to some or all of the software represented by the flowcharts of FIGS. 15 and 16. As such, the FPGA circuitry 1900 may be structured to effectively instantiate some or all of the machine readable instructions of the flowcharts of FIGS. 15 and 16 as dedicated logic circuits to perform the operations corresponding to those software instructions in a dedicated manner analogous to an ASIC. Therefore, the FPGA circuitry 1900 may perform the operations corresponding to the some or all of the machine readable instructions of FIG. 19 faster than the general purpose microprocessor can execute the same.

In the example of FIG. 19, the FPGA circuitry 1900 is structured to be programmed (and/or reprogrammed one or more times) by an end user by a hardware description language (HDL) such as Verilog. The FPGA circuitry 1900 of FIG. 19, includes example input/output (I/O) circuitry 1902 to obtain and/or output data to/from example configuration circuitry 1904 and/or external hardware (e.g., external hardware circuitry) 1906. For example, the configuration circuitry 1904 may implement interface circuitry that may obtain machine readable instructions to configure the FPGA circuitry 1900, or portion(s) thereof. In some such examples, the configuration circuitry 1904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1906 may implement the microprocessor 1800 of FIG. 18. The FPGA circuitry 1900 also includes an array of example logic gate circuitry 1908, a plurality of example configurable interconnections 1910, and example storage circuitry 1912. The logic gate circuitry 1908 and interconnections 1910 are configurable to instantiate one or more operations that may correspond to at least some of the machine readable instructions of FIGS. 15 and 16 and/or other desired operations. The logic gate circuitry 1908 shown in FIG. 19 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1908 to enable configuration of the electrical structures and/or the logic gates to form circuits to perform desired operations. The logic gate circuitry 1908 may include other electrical structures such as look-up tables (LUTs), registers (e.g., flip-flops or latches), multiplexers, etc.

The interconnections 1910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1908 to program desired logic circuits.

The storage circuitry 1912 of the illustrated example is structured to store result(s) of the one or more of the operations performed by corresponding logic gates. The storage circuitry 1912 may be implemented by registers or the like. In the illustrated example, the storage circuitry 1912 is distributed amongst the logic gate circuitry 1908 to facilitate access and increase execution speed.

The example FPGA circuitry 1900 of FIG. 19 also includes example Dedicated Operations Circuitry 1914. In this example, the Dedicated Operations Circuitry 1914 includes special purpose circuitry 1916 that may be invoked to implement commonly used functions to avoid the need to program those functions in the field. Examples of such special purpose circuitry 1916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1900 may also include example general purpose programmable circuitry 1918 such as an example CPU 1920 and/or an example DSP 1922. Other general purpose programmable circuitry 1918 may additionally or alternatively be present such as a GPU, an XPU, etc., that can be programmed to perform other operations.

Although FIGS. 18 and 19 illustrate two example implementations of the processor circuitry 1712 of FIG. 17, many other approaches are contemplated. For example, as mentioned above, modern FPGA circuitry may include an on-board CPU, such as one or more of the example CPU 1920 of FIG. 19. Therefore, the processor circuitry 1612 of FIG. 16 may additionally be implemented by combining the example microprocessor 1800 of FIG. 18 and the example FPGA circuitry 1900 of FIG. 19. In some such hybrid examples, a first portion of the machine readable instructions represented by the flowcharts of FIGS. 15 and 16 may be executed by one or more of the cores 1802 of FIG. 18, a second portion of the machine readable instructions represented by the flowcharts of FIGS. 15 and 16 may be executed by the FPGA circuitry 1900 of FIG. 19, and/or a third portion of the machine readable instructions represented by the flowcharts of FIGS. 15 and 16 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 1712 of FIG. 17 may be in one or more packages. For example, the processor circuitry 1800 of FIG. 18 and/or the FPGA circuitry 1900 of FIG. 19 may be in one or more packages. In some examples, an XPU may be implemented by the processor circuitry 1712 of FIG. 17, which may be in one or more packages. For example, the XPU may include a CPU in one package, a DSP in another package, a GPU in yet another package, and an FPGA in still yet another package.

Figure 20:
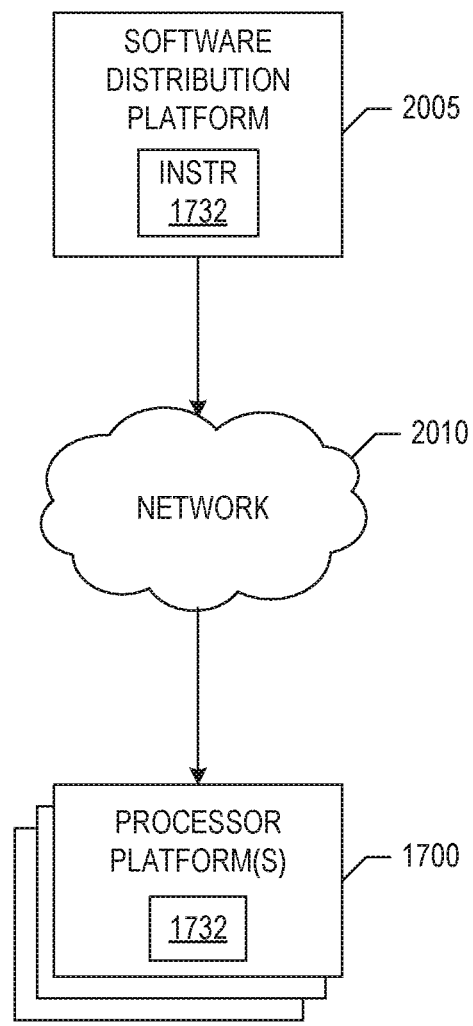
FIG. 20 is a block diagram of an example software distribution platform (e.g., one or more servers) to distribute software (e.g., software corresponding to the example machine readable instructions of FIG. 15) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 2005 to distribute software such as the example machine readable instructions 1732 of FIG. 17 to hardware devices owned and/or operated by third parties is illustrated in FIG. 20. The example software distribution platform 2005 may be implemented by any computer server, data facility, cloud service, etc., capable of storing and transmitting software to other computing devices. The third parties may be customers of the entity owning and/or operating the software distribution platform 2005. For example, the entity that owns and/or operates the software distribution platform 2005 may be a developer, a seller, and/or a licensor of software such as the example machine readable instructions 1732 of FIG. 17. The third parties may be consumers, users, retailers, OEMs, etc., who purchase and/or license the software for use and/or re-sale and/or sub-licensing. In the illustrated example, the software distribution platform 2005 includes one or more servers and one or more storage devices. The storage devices store the machine readable instructions 1732, which may correspond to the example machine readable instructions of FIGS. 15 and 16, as described above. The one or more servers of the example software distribution platform 2005 are in communication with a network 2010, which may correspond to any one or more of the Internet and/or any of the example networks 104, 1726 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1732 from the software distribution platform 2005. For example, the software, which may correspond to the example machine readable instructions of FIGS. 15 and 16, may be downloaded to the example processor platform 400, which is to execute the machine readable instructions 1732 to implement the synchronization circuitry 120. In some example, one or more servers of the software distribution platform 2005 periodically offer, transmit, and/or force updates to the software (e.g., the example machine readable instructions 1732 of FIG. 17) to ensure improvements, patches, updates, etc., are distributed and applied to the software at the end user devices.

From the foregoing, it will be appreciated that example systems, methods, apparatus, and articles of manufacture have been disclosed that provide a multi-device system with trigger synchronization, data aggregation, image processing at the edge, and real-time, high bandwidth data transfer to users. Examples disclosed herein provide high resolution streaming. Examples disclosed herein combine hardware triggering and global timestamping to achieve micro-second precision and consistency in a multi-device system (e.g., daisy chained devices). Examples disclosed herein enable synchronization of a multi-device system with efficient use of external cables. Examples disclosed herein provide a scalable multi-device system for use with multiple different types of devices (e.g., cameras, microphones, speakers, etc.). Examples disclosed herein include a high speed Peripheral Component Interconnect Express (PCIe) interface. Examples disclosed herein can be used to develop immersive visual experience (IVE) algorithms for video streaming, instructional video recording, online influencing live streaming, and/or immersive teleconferencing. Disclosed systems, methods, apparatus, and articles of manufacture improve the efficiency of using a computing device by syncing devices (e.g., cameras, inertial sensors, microphones, etc.) associated with the computing device. Disclosed systems, methods, apparatus, and articles of manufacture are accordingly directed to one or more improvement(s) in the operation of a machine such as a computer or other electronic and/or mechanical device.

Example 1 includes an apparatus for synchronizing multiple devices, the apparatus comprising at least one memory, instructions, and processor circuitry to execute the instructions to at least obtain first images using a first trigger frequency and second images using a second trigger frequency, the second trigger frequency different from the first trigger frequency, identify a first number of time units between a first time corresponding to a first one of the first images and a second time corresponding to a first one of the second images, the first number of time units defining a first time window, and in response to the first time window exceeding a threshold, adjust the second trigger frequency based on the number of time units such that a subsequent time window satisfies the threshold.

Example 2 includes the apparatus of example 1, further including a first device to obtain the first images and a second device to obtain the second images.

Example 3 includes the apparatus of example 2, wherein the first and second devices are cameras.

Example 4 includes the apparatus of example 2, wherein the processor circuitry is to at least determine the first trigger frequency based on a first oscillator of the first device and the second trigger frequency based on an oscillator of the second device.

Example 5 includes the apparatus of example 1, wherein the threshold is 16 microseconds.

Example 6 includes the apparatus of example 1, wherein the processor circuitry is to at least obtain audio using a third trigger frequency, the third trigger frequency different from the first trigger frequency and the second trigger frequency, identify a second number of time units between the first time and a third time corresponding to the audio, the second number of time units defining a second time window, and in response to the second time window exceeding the threshold, adjust the third trigger frequency based on the second number of time units such that subsequent time units satisfy the threshold.

Example 7 includes the apparatus of example 6, further including a third device to obtain the audio.

Example 8 includes the apparatus of example 7, wherein the third device is a microphone and the first device is a camera.

Example 9 includes the apparatus of example 6, wherein the processor circuitry is to determine a synchronized frameset based on the adjusted second trigger frequency and the adjusted third trigger frequency, wherein the synchronized frameset is a data file including the first images, the second images, and the audio.

Example 10 includes At least one non-transitory computer readable medium comprising computer readable instructions that, when executed, cause at least one processor to at least obtain first images using a first trigger frequency and second images of using a second trigger frequency, the second trigger frequency different from the first trigger frequency, identify a first number of time units between a first time corresponding to a first one of the first images and a second time corresponding to a first one of the second images, the first number of time units defining a first time window, and in response to the first time window exceeding a threshold, adjust the second trigger frequency based on the number of time units such that subsequent time windows satisfy the threshold.

Example 11 includes the at least one non-transitory computer readable medium of example 10, further including a first device to obtain the first images and a second device for obtaining the second images.

Example 12 includes the at least one non-transitory computer readable medium of example 11, wherein the first and second devices are cameras.

Example 13 includes the at least one non-transitory computer readable medium of example 11, wherein the instructions cause the at least one processor to determine the first trigger frequency based on a first oscillator of the first device and the second trigger frequency based on an oscillator of the second device.

Example 14 includes the at least one non-transitory computer readable medium of example 10, wherein the threshold is 16 microseconds.

Example 15 includes the at least one non-transitory computer readable medium of example 8, wherein the instructions cause the at least one processor to obtain audio using a third trigger frequency, the third trigger frequency different from the first trigger frequency and the second trigger frequency, identify a second number of time units between the first time and a third time corresponding to the audio, the second number of time units defining a second time window, and in response to the second time window exceeding the threshold, adjust the third trigger frequency based on the second number of time units such that subsequent time units satisfy the threshold.

Example 16 includes the at least one non-transitory computer readable medium of example 15, further including a third device to obtain audio.

Example 17 includes the at least one non-transitory computer readable medium of example 16, wherein the third device is a microphone and the first device is a camera.

Example 18 includes the at least one non-transitory computer readable medium of example 15, wherein the instructions cause the at least one processor to determine a synchronized frameset based on the adjusted second trigger frequency and the adjusted third trigger frequency, wherein the synchronized frameset is a data file including the first images, the second images, and the audio.

Example 19 includes a method for synchronizing multiple devices, the method comprising obtaining first images using a first trigger frequency and second images using a second trigger frequency, the second trigger frequency different from the first trigger frequency, identifying a first number of time units between a first time corresponding to a first one of the first images and a second time corresponding to a first one of the second images, the first number of time units defining a first time window, and in response to the first time window exceeding a threshold, adjusting the second trigger frequency based on the number of time units such that subsequent time windows satisfy the threshold.

Example 20 includes the method of example 19, wherein the first images are obtained from a first device and the second images are obtained from a second device.

Example 21 includes the method of example 20, further including determining the first trigger frequency based on a first oscillator of the first device and the second trigger frequency based on an oscillator of the second device.

Example 22 includes the method of example 19, further including obtaining audio using a third trigger frequency, the third trigger frequency different from the first trigger frequency and the second trigger frequency, identifying a second number of time units between the first time and a third time corresponding to the audio, the second number of time units defining a second time window, and in response to the second time window exceeding the threshold, adjusting the third trigger frequency based on the second number of time units such that subsequent time units satisfy the threshold.

Example 23 includes the method of example 22, wherein the audio is obtained from a third device.

Example 24 includes the method of example 22, further including determining a synchronized frameset based on the adjusted second trigger frequency and the adjusted third trigger frequency, wherein the synchronized frameset is a data file including the first images, the second images, and the audio.

Example 25 includes an apparatus comprising means for obtaining first images using a first trigger frequency and second images using a second trigger frequency, the second trigger frequency different from the first trigger frequency, means for identifying a first number of time units between a first time corresponding to a first one of the first images and a second time corresponding to a first one of the second images, the first number of time units defining a first time window, and means for adjusting to, in response to the first time window exceeding a threshold, means for adjusting to adjust the second trigger frequency based on the number of time units such that subsequent time windows satisfy the threshold.

Example 26 includes the apparatus of example 25, wherein the means for obtaining the first images includes a first device and the means for obtaining the second images includes a second device.

Example 27 includes the apparatus of example 26, wherein the first and second devices are cameras.

Example 28 includes the apparatus of example 26, further including means for determining to determine the first trigger frequency based on a first oscillator of the first device and the second trigger frequency based on an oscillator of the second device.

Example 29 includes the apparatus of example 25, wherein the threshold is 16 microseconds.

Example 30 includes the apparatus of example 25, further including means for obtaining audio using a third trigger frequency, the third trigger frequency different from the first trigger frequency and the second trigger frequency, and wherein the means for identifying is to identify a second number of time units between the first time and a third time corresponding to the audio, the second number of time units defining a second time window, and the means for adjusting is to, in response to the second time window exceeding the threshold, adjust the third trigger frequency based on the second number of time units such that subsequent time units satisfy the threshold.

Example 31 includes the apparatus of example 30, wherein the means for obtaining audio includes a third device.

Example 32 includes the apparatus of example 31, wherein the third device is a microphone.

Example 33 includes the apparatus of example 30, further including means for determining a synchronized frameset based on the adjusted second trigger frequency and the adjusted third trigger frequency, wherein the synchronized frameset is a data file including the first images, the second images, and the audio.

Example 34 includes a multi-device system comprising sensors to obtain data, the data including at least one of images, audio, or movement data, and a Field Programmable Gate Array (FPGA) communicatively coupled to each one of the sensors, the FPGA to send periodic pulses to the sensors, the periodic pulses indicating a rate of the data collection, the FPGA including a multi-port memory controller to transmit data to a host Personal Computer (PC), and a Peripheral Component Interconnect Express (PCIe) controller to create a frameset of the data, the frameset including at least one of the images, the audio, or the movement data.

Example 35 includes the system of example 34, wherein the periodic pulses enable time synchronization of the data from the sensors.

Example 36 includes the system of example 35, wherein the frameset includes the synchronized data.

Example 37 includes the system of example 34, wherein the FPGA further includes a clock, the clock to provide the rate of the data collection.

Example 38 includes the system of example 34, wherein the multi-port memory controller transmits data to the host PC via the PCIe controller.

Example 39 includes the system of example 34, wherein the movement data includes human movement.

What is claimed is:

1. An apparatus for synchronizing multiple devices, the apparatus comprising:
at least one memory;
instructions; and
processor circuitry to execute the instructions to at least:
obtain, in a time duration, first images using a first trigger frequency and second images using a second trigger frequency, the first trigger frequency representing a first number of pulses in the time duration, the second trigger frequency representing a second number of pulses in the time duration, the second number of pulses different from the first number of pulses;
identify a first number of time units between a first time corresponding to a first one of the first images and a second time corresponding to a first one of the second images, the first number of time units defining a first time window; and
in response to the first time window exceeding a threshold, adjust the second trigger frequency by adjusting the second number of pulses in the time duration such that a subsequent time window satisfies the threshold.

2. The apparatus of claim 1, further including a first device to obtain the first images and a second device to obtain the second images.

3. The apparatus of claim 2, wherein the first and second devices are cameras.

4. The apparatus of claim 2, wherein the processor circuitry is to at least determine the first trigger frequency based on a first oscillator of the first device and the second trigger frequency based on an oscillator of the second device.

5. The apparatus of claim 2, wherein the processor circuitry is to at least:
obtain audio using a third trigger frequency, the third trigger frequency different from the first trigger frequency and the second trigger frequency;
identify a second number of time units between the first time and a third time corresponding to the audio, the second number of time units defining a second time window; and
in response to the second time window exceeding the threshold, adjust the third trigger frequency based on the second number of time units such that subsequent time units satisfy the threshold.

6. The apparatus of claim 5, further including a third device to obtain the audio.

7. The apparatus of claim 6, wherein the third device is a microphone and the first device is a camera.

8. The apparatus of claim 5, wherein the processor circuitry is to determine a synchronized frameset based on the adjusted second trigger frequency and the adjusted third trigger frequency, wherein the synchronized frameset is a data file including the first images, the second images, and the audio.

9. The apparatus of claim 1, wherein the threshold is 16 microseconds.

10. At least one non-transitory computer readable medium comprising computer readable instructions that, when executed, cause at least one processor to at least:
obtain, in a time duration, first images using a first trigger frequency and second images using a second trigger frequency, the first trigger frequency representing a first number of pulses in the time duration, the second trigger frequency representing a second number of pulses in the time duration, the second number of pulses different from the first number of pulses;
identify a first number of time units between a first time corresponding to a first one of the first images and a second time corresponding to a first one of the second images, the first number of time units defining a first time window; and
in response to the first time window exceeding a threshold, adjust the second trigger frequency by adjusting the second number of pulses in the time duration such that subsequent time windows satisfy the threshold.

11. The at least one non-transitory computer readable medium of claim 10, further including a first device to obtain the first images and a second device for obtaining the second images.

12. The at least one non-transitory computer readable medium of claim 11, wherein the first and second devices are cameras.

13. The at least one non-transitory computer readable medium of claim 11, wherein the instructions cause the at least one processor to determine the first trigger frequency based on a first oscillator of the first device and the second trigger frequency based on an oscillator of the second device.

14. The at least one non-transitory computer readable medium of claim 11, wherein the instructions cause the at least one processor to:
obtain audio using a third trigger frequency, the third trigger frequency different from the first trigger frequency and the second trigger frequency;
identify a second number of time units between the first time and a third time corresponding to the audio, the second number of time units defining a second time window; and
in response to the second time window exceeding the threshold, adjust the third trigger frequency based on the second number of time units such that subsequent time units satisfy the threshold.

15. The at least one non-transitory computer readable medium of claim 14, further including a third device to obtain audio.

16. The at least one non-transitory computer readable medium of claim 15, wherein the third device is a microphone and the first device is a camera.

17. The at least one non-transitory computer readable medium of claim 14, wherein the instructions cause the at least one processor to determine a synchronized frameset based on the adjusted second trigger frequency and the adjusted third trigger frequency, wherein the synchronized frameset is a data file including the first images, the second images, and the audio.

18. The at least one non-transitory computer readable medium of claim 10, wherein the threshold is 16 microseconds.

19. An apparatus comprising:
means for obtaining, in a time duration, first images using a first trigger frequency and second images using a second trigger frequency, the first trigger frequency representing a first number of pulses in the time duration, the second trigger frequency representing a second number of pulses in the time duration, the second number of pulses different from the first number of pulses trigger frequency;
means for identifying a first number of time units between a first time corresponding to a first one of the first images and a second time corresponding to a first one of the second images, the first number of time units defining a first time window; and
means for adjusting to, in response to the first time window exceeding a threshold, means for adjusting to adjust the second trigger frequency by adjusting the second number of pulses in the time duration such that subsequent time windows satisfy the threshold.

20. The apparatus of claim 19, wherein the means for obtaining the first images includes a first device and the means for obtaining the second images includes a second device.

21. The apparatus of claim 20, wherein the first and second devices are cameras.

22. The apparatus of claim 20, further including means for determining to determine the first trigger frequency based on a first oscillator of the first device and the second trigger frequency based on an oscillator of the second device.

23. The apparatus of claim 19, further including means for obtaining audio using a third trigger frequency, the third trigger frequency different from the first trigger frequency and the second trigger frequency, and wherein:
the means for identifying is to identify a second number of time units between the first time and a third time corresponding to the audio, the second number of time units defining a second time window; and
the means for adjusting is to, in response to the second time window exceeding the threshold, adjust the third trigger frequency based on the second number of time units such that subsequent time units satisfy the threshold.

24. The apparatus of claim 23, wherein the means for obtaining audio includes a third device.

25. The apparatus of claim 23, further including means for determining a synchronized frameset based on the adjusted second trigger frequency and the adjusted third trigger frequency, wherein the synchronized frameset is a data file including the first images, the second images, and the audio.

* * * * *

UNITED STATES PATENT AND TRADEMARK OFFICE
CERTIFICATE OF CORRECTION

| | | |
|---|---|---|
| PATENT NO. | : 12,069,365 B2 | |
| APPLICATION NO. | : 17/711941 | |
| DATED | : August 20, 2024 | |
| INVENTOR(S) | : Popovic et al. | |

It is certified that error appears in the above-identified patent and that said Letters Patent is hereby corrected as shown below:

In the Claims

Column 32, Claim 19, Line 22, Delete "trigger frequency".

Signed and Sealed this
Eighth Day of October, 2024

Katherine Kelly Vidal
*Director of the United States Patent and Trademark Office*